(12) United States Patent
Kimura et al.

(10) Patent No.: US 6,270,199 B1
(45) Date of Patent: *Aug. 7, 2001

(54) LIQUID EJECTING HEAD, LIQUID EJECTING DEVICE AND LIQUID EJECTING METHOD

(75) Inventors: Makiko Kimura, Sagamihara; Hiroshi Sugitani, Machida; Tadayoshi Inamoto, Hachioji; Yoshie Nakata, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/632,530

(22) Filed: Apr. 15, 1996

(30) Foreign Application Priority Data

| Apr. 14, 1995 | (JP) | 7-089058 |
| Jun. 8, 1995 | (JP) | 7-142214 |
| Apr. 11, 1996 | (JP) | 8-089825 |

(51) Int. Cl.$^7$ .............. B41J 2/14; B41J 2/050
(52) U.S. Cl. ............ 347/65; 347/48; 347/101
(58) Field of Search .............. 347/65, 63, 48, 347/101, 94, 42, 15, 62

(56) References Cited

U.S. PATENT DOCUMENTS

| 4,251,824 | * 2/1981 | Hara ................... 347/48 X |
| 4,429,321 | * 1/1984 | Matsumoto ............. 347/59 |
| 4,480,259 | 10/1984 | Kruger et al. ........... 347/63 |
| 4,496,960 | 1/1985 | Fischbeck ............... 347/68 |
| 4,509,063 | 4/1985 | Sugitani et al. .......... 347/65 |
| 4,558,333 | 12/1985 | Sugitani et al. .......... 347/65 |
| 4,568,953 | 2/1986 | Aoki et al. .............. 347/65 |
| 4,611,219 | 9/1986 | Sugitani et al. .......... 347/40 |
| 4,646,110 | 2/1987 | Ikeda et al. ............. 347/15 |
| 4,698,645 | 10/1987 | Inamoto ................ 347/65 |
| 4,702,742 | * 10/1987 | Iwata .................. 347/101 X |
| 4,723,129 | 2/1988 | Endo et al. ............. 347/56 |
| 4,723,136 | * 2/1988 | Suzumura .............. 347/65 |
| 5,262,802 | 11/1993 | Karita et al. ............ 347/87 |
| 5,278,585 | 1/1994 | Karz et al. ............. 347/65 |
| 5,296,875 | 3/1994 | Suda ................... 347/89 X |
| 5,389,957 | 2/1995 | Kimura et al. .......... 347/20 |
| 5,485,184 | 1/1996 | Nakagomi et al. ........ 347/63 |
| 5,933,163 | * 8/1999 | Koizxumi ............... 347/63 X |
| 6,007,187 | 12/1999 | Kashino et al. ......... 347/65 |

FOREIGN PATENT DOCUMENTS

| 0436047 | 7/1991 | (EP) | B41J/2/055 |
| 0443798 | 8/1991 | (EP) | B41J/2/14 |
| 0496533 | 7/1992 | (EP) | B41J/2/055 |
| 0538147 | 4/1993 | (EP) | B41J/2/195 |
| 61-59914 | 2/1980 | (JP) | B41J/3/04 |
| 55-81172 | 6/1980 | (JP) | B41J/3/04 |
| 61-69467 | 4/1986 | (JP) | B41J/3/04 |
| 61-110557 | 5/1986 | (JP) | B41J/3/04 |
| 62-156969 | 7/1987 | (JP) | B41J/3/04 |

(List continued on next page.)

Primary Examiner—Fred L Braun
(74) Attorney, Agent, or Firm—Fitzpatrick, Cella, Harper & Scinto

(57) ABSTRACT

A liquid ejecting head capable of ejecting liquids in different conditions includes an ejection outlet for ejecting a liquid; a liquid flow path for supplying the liquid to the ejection outlet, the liquid flow path having bubble generation heat elements used to eject the liquid and capable of selectively generating bubbles having different sizes; and a movable mechanism having at least one movable member arranged to face a bubble generation region formed in the liquid flow path by the bubble generation heat elements. The movable member has a free end on a downstream side with respect to a direction of the ejection outlet and a supporting member on an upstream side. The movable member is displaced in a direction to separate from the bubble generation region in accordance with a bubble generated by the bubble generation heat elements.

42 Claims, 23 Drawing Sheets

FOREIGN PATENT DOCUMENTS

| | | | |
|---|---|---|---|
| 62-202740 * | 9/1987 | (JP) | B41J/3/04 |
| 62-48585 | 10/1987 | (JP) | B41J/3/04 |
| 62-261452 | 11/1987 | (JP) | B41J/3/04 |
| 63-197652 | 8/1988 | (JP) | B41J/3/04 |
| 63-199972 | 8/1988 | (JP) | F16K/15/14 |
| 1-235652 | 9/1989 | (JP) | B41J/3/04 |
| 2-113950 | 4/1990 | (JP) | B41J/2/175 |
| 2-239940 | 9/1990 | (JP) | B41J/2/05 |
| 3-81155 | 4/1991 | (JP) | B41J/2/05 |
| 5-124189 | 5/1993 | (JP) | B41J/2/05 |
| 6-31918 | 2/1994 | (JP) | B41J/2/05 |
| 6-87214 | 3/1994 | (JP) | B41J/2/05 |

* cited by examiner

LIQUID EJECTING HEAD, LIQUID EJECTING DEVICE AND LIQUID EJECTING METHOD

BACKGROUND OF THE INVENTION

1. Field of the Invention

The present invention relates to a liquid ejecting head for ejecting a desired liquid using generation of a bubble by applying thermal energy to the liquid, a head carriage using the liquid ejecting head, a liquid ejecting device, a liquid ejecting method, and a recording method. It further relates to an ink jet head kit containing the liquid ejecting head.

More specifically, the present invention relates to a liquid ejecting head having a movable member which is displaced using generation of a bubble, and a head cartridge using the liquid ejecting head, and a liquid ejecting device using the same. The present invention further relates to a liquid ejecting method and recording method for ejecting the liquid by displacing the movable member using the generation of the bubble.

The present invention can be applied to a printer for performing a recording operation with respect to a recording medium consisting of, e.g., a paper material, thread, fiber, textile, leather, metal, plastic resin, glass, wood, or ceramic material, a copying machine, a facsimile apparatus having a communication system, a device such as a wordprocessor having a printer unit, and an industrial recording apparatus constituted by a combination of various processing devices.

In this specification, "recording" means not only forming an image having a specific meaning, e.g., a letter or graphic pattern, but also includes forming an image having no specific meaning, e.g., a pattern.

2. Related Background Art

An ink jet recording method of so-called bubble jet type is known in which an instantaneous state change resulting in an instantaneous volume change (bubble generation) is caused by application of energy such as heat to the ink, so as to eject the ink through the ejection outlet using the force resulted from the state change by which the ink is ejected to and deposited on the recording medium to from an image. As disclosed in U.S. Pat. No. 4,723,129, a recording device using the bubble jet recording method comprises an ejection outlet for ejecting the ink, an ink flow path in fluid communication with the ejection outlet, and an electrothermal transducer as an energy generation means disposed in the ink flow path.

Such a recording method is advantageous in that, a high-quality image can be recorded at high speed and with low noise, and a plurality of such ejection outlets can be positioned at a high density, and therefore, a small-size recording apparatus capable of providing a high resolution can be provided, and color images can be easily formed. Therefore, the bubble jet recording method is now widely used in printers, copying machines, facsimile apparatuses or other office equipment, and for industrial systems such as a textile printing device or the like.

As the bubble jet technique has been widely used for products in various fields, various demands have recently arisen as follows.

For example, an improvement in energy efficiency is demanded. To meet the demand, the optimization of the heat generating element such as adjustment of the thickness of the protection film is studied. This method is effective in that a propagation efficiency of the generated heat to the liquid is improved.

In order to provide high-quality images, drive conditions have been proposed by which the ink ejection speed is increased, and/or the bubble generation is stabilized to accomplish better ink ejection. As another example, from the viewpoint of increasing the recording speed, flow path structure improvements have been proposed by which the rate of liquid filing (refilling) into the liquid flow path is increased.

Of these flow path forms, the flow path structure shown in FIGS. 1A and 1B is disclosed in Japanese Laid-Open Patent Application No. 63-199972 and the like. The flow path structure and the head manufacturing method disclosed in this publication have been invented in consideration of a back wave (a pressure propagating in an opposite direction to an ejection outlet, i.e., pressure propagating toward a liquid chamber 12). This back wave is known as loss energy because this energy does not propagate in the ejection direction.

The invention shown in FIGS. 1A and 1B discloses a valve 10 separated from an area where a bubble is formed by a heat generating element 2, and located at the opposite side to an ejection outlet 11 with respect to the heat generating element 2.

Referring to FIG. 1B, this valve 10 is manufactured by a method using a plate material or the like such that the valve 10 is adhered to the ceiling of a flow path 3 at the initial position, and hangs down into the flow path 3 upon generation of a bubble. This invention is disclosed as a technique of suppressing the energy loss by controlling part of the above back wave using the valve 10.

As is apparent from consideration of a case wherein a bubble is generated in the flow path 3 holding a liquid to be ejected, in this structure, suppression of part of a back wave by means of the valve 10 is not practicable in terms of liquid ejection.

As described above, a back wave itself is not directly associated with liquid ejection. As shown in FIG. 1A, when this back wave is generated in the flow path 3, part of the pressure generated by a bubble which is directly associated with ejection has already allowed the liquid to be ejected from the flow path 3. As is apparent, therefore, suppression of part of the back wave does not greatly influence ejection.

On the other hand, in the bubble jet recording method, heating is repeated with the heat generating element contacting the ink, and therefore, a burnt material is deposited on the surface of the heat generating element due to scorching of the ink. However, the amount of the deposition may be large depending on the kind of ink. If this occurs, the ink ejection becomes unstable. Additionally, even when the liquid to be ejected is the one easily degraded by heat or even when the liquid is the one with which the bubble generation is not sufficient, the liquid is desired to be properly ejected without any property change.

Japanese Laid-Open Patent Application Nos. 61-69467 and 55-81172 and U.S. Pat. No. 4,480,259 disclose that different liquids are used for the liquid generating the bubble by the heat (bubble generation liquid) and for the liquid to be ejected (ejection liquid). In these publications, the ink as the ejection liquid and the bubble generation liquid are completely separated by a flexible film of silicone rubber or the like so as to prevent direct contact between the ejection liquid and the heat generating element while the pressure resulting from the bubble generation of the bubble generation liquid propagates to the ejection liquid by the deformation of the flexible film. With such a structure, deposition on the surface of the heat generating element is prevented, or the degree of freedom in selecting an ejection liquid is increased.

However, with this structure in which the ejection liquid and the bubble generation liquid are completely separated, the pressure by the bubble generation is caused to propagate to the ejection liquid through the expansion-contraction deformation of the flexible film, and therefore, the pressure is absorbed by the flexible film to a quite high degree.

In addition, the deformation of the flexible film is not so large, and therefore, the energy efficiency and the ejection force are degraded although the some effect is provided by separating the ejection liquid from the bubble generation liquid.

As a gradation recording method, Japanese Patent Publication No. 62-48585 discloses a method of changing the size of an ink droplet to be ejected by driving a plurality of heat generating elements, which are arranged in one liquid flow path to be driven independently, at desired timings.

In this publication, two heat generating elements are arranged in one flow path to be driven independently. In this case, when the elements are driven at the same timing, the resultant bubble has the maximum volume. As the timings are shifted from each other, the volume decreases. With changes in the size of an ink droplet, gradation is obtained.

SUMMARY OF THE INVENTION

In analyzing the current situation of the conventional gradation recording techniques, the present inventors gave their attention to an image constituted by relatively large and small dots. Theoretically, desired dots should be formed at designated positions. In practice, however, the image includes an "offset" which is small but large enough to be visually recognized, or "dot disturbance" which can be seen at a magnification of about ×50.

Similarly, when the present inventors examined a smoothing technique using relatively large and small dots, they found an "offset" and "dot disturbance".

Upon analyzing the fundamental instability factors for the conventional large/small dot forming techniques, the present inventors found the following two problems.

The first problem is that when a bubble is generated by an electrothermal transducer means (e.g., a plurality of heaters) for generating bubbles having relatively different sizes, the generation of the bubble is disturbed and the volume of an ejected liquid (droplet) changes accordingly with variations in the environmental conditions for the bubble generation region.

The second problem is that, in addition to the first problem, when the ejected state (in particular, the ejection rate) of an ejected liquid (droplet) for forming an image, varies due to the causes and the like in the first problem, the ink landing precision deteriorates, resulting in relatively low image quality. The second problem is the fundamental problem for the gradation recording methods and the smoothing techniques using large and small or large, intermediate, and small dots, and is known more popularly than the first problem.

The principal problem of the present invention is to provide a head which can solve the problem of the disturbance of an ejected liquid, and a gradation recording method, a smoothing method, or a pre-ejection (ejection performed by using a signal other than a recording signal to improve the condition in the head) method using the head.

It is another object of the present invention to solve the first problem and provide a head which has a structure as a characteristic feature in which a movable member having a free end on the downstream side and a supporting member on the upstream side with respect to the direction of an ejection outlet is arranged for a bubble generation heat means for selectively generating bubbles having different sizes to face a bubble generation region, and can stabilize the volume of an ejected droplet to a desired value on the basis of the balance between the growth of a bubble and the displacement of a movable member, with the structure, even if the environmental conditions of the bubble generation region slightly vary, and a method and apparatus using the head.

It is still another object of the present invention to solve the second problem. In solving the second problem, when bubbles having different sizes are to be generated by the bubble generation heat means, preferable conditions are found with respect to the function of the movable member itself. That is, the movable member itself further changes the growth of the bubble itself to further stabilize the volume of the ejected liquid. In addition, the ejection speed of the ejected liquid can be increased and stabilized.

It is, therefore, still another object of the present invention to provide a head which can supply a liquid having a desired volume to a desired position with high precision by increasing the ejection efficiency and the ejection rate upon attaining stability of bubbles having different sizes, and a method and apparatus using the head.

Other objects of the present invention will be apparent from the following detailed description in conjunction with the preferred embodiments.

More specifically, it is an object of the present invention to provide a liquid ejecting head capable of ejecting liquids in different conditions, comprising an ejection outlet for ejecting a liquid, a liquid flow path for supplying the liquid to the ejection outlet, the liquid flow path having bubble generation heat means used to eject the liquid and capable of selectively generating bubbles having different sizes, and a movable mechanism having at least one movable member arranged to face a bubble generation region formed in the liquid flow path by the bubble generation heat means, the movable member having a free end on a downstream side with respect to a direction of the ejection outlet, and a supporting member on an upstream side, and being displaced in a direction to separate from the bubble generation region in accordance with a bubble generated by the bubble generation heat means.

It is another object of the present invention to provide a liquid ejecting method of ejecting a liquid upon generation of a bubble, comprising the steps of using a liquid ejecting head including an ejection outlet for ejecting a liquid, a liquid flow path having a heat generating element for generating a bubble in the liquid, and a movable member which is arranged to face the heat generating element, can be displaced between a first position and a second position farther from the heat generating element than the first position, and has a free end, and displacing the movable member using a pressure based on generation of the bubble to cause the bubble to expand more greatly at a downstream side than at an upstream side with respect to a direction of the ejection outlet, and to change a displaced state of the movable member, thereby changing an ejection amount of the liquid.

It is still another object of the present invention to provide a pre-ejecting method for a liquid ejecting head, comprising the steps of using a liquid ejecting head including an ejection outlet for ejecting a liquid, a liquid flow path for supplying the liquid to the ejection outlet, the liquid flow path having bubble generation heat means used to eject the liquid and capable of selectively generating bubbles having different sizes, and a movable mechanism having at least one movable member arranged to face a bubble generation region formed in the liquid flow path by the bubble generation heat means, the movable member having a free end on a downstream side with respect to a direction of the ejection outlet, and a supporting member on an upstream side, and displacing the movable member in a direction to separate from the bubble generation region, forming a largest bubble of the bubbles which can be formed by the bubble generation heat means, and causing the movable member to guide the largest bubble to the ejection outlet, thereby performing a pre-ejection process from the ejection outlet.

It is still another object of the present invention to provide a recording method of performing a gradation recording operation using a liquid ejecting head for ejecting a liquid, comprising the steps of using the liquid ejecting head including an ejection outlet for ejecting a liquid, a liquid flow path for supplying the liquid to the ejection outlet, the liquid flow path having bubble generation heat means used to eject the liquid and capable of selectively generating bubbles having different sizes, and a movable mechanism having at least one movable member arranged to face a bubble generation region formed in the liquid flow path by the bubble generation heat means, the movable member having a free end on a downstream side with respect to a direction of the ejection outlet, and a supporting member on an upstream side, and displacing the movable member in a direction to separate from the bubble generation region in accordance with each of the bubbles having the different sizes, and causing the movable member to guide the bubbles to the ejection outlet so as to form droplets having the different sizes in accordance with the sizes of the bubbles, thereby performing a gradation recording operation.

It is still another object of the present invention to provide a recording method of performing a smoothing operation using a liquid ejecting head capable of ejecting droplets having different sizes, comprising the steps of using the liquid ejecting head including an ejection outlet for ejecting a liquid, a liquid flow path for supplying the liquid to the ejection outlet, the liquid flow path having bubble generation heat means used to eject the liquid and capable of selectively generating bubbles having the different sizes, and a movable mechanism having at least one movable member arranged to face a bubble generation region formed in the liquid flow path by the bubble generation heat means, the movable member having a free end on a downstream side with respect to a direction of the ejection outlet, and a supporting member on an upstream side, and displacing the movable member in a direction to separate from the bubble generation region in accordance with each of the bubbles having the different sizes, causing the movable member to guide the bubbles to the ejection outlet so as to supply the droplets having the different sizes corresponding to the sizes of the bubbles to a boundary between an image portion and a non-image portion, thereby performing a smoothing operation.

It is still another object of the present invention to provide an ink jet recording device using a liquid ejecting head capable of ejecting liquids in different conditions, comprising a mount portion on which the liquid ejecting head is mounted, the liquid ejecting head including an ejection outlet for ejecting a liquid, a liquid flow path for supplying the liquid to the ejection outlet, the liquid flow path having bubble generation heat means used to eject the liquid and capable of selectively generating bubbles having different sizes, and a movable mechanism having at least one movable member arranged to face a bubble generation region formed in the liquid flow path by the bubble generation heat means, the movable member having a free end on a downstream side with respect to a direction of the ejection outlet, and a supporting member on an upstream side, and being displaced in a direction to separate from the bubble generation region in accordance with a bubble generated by the bubble generation heat means, and drive condition selection means for supplying the bubble generation heat means of the liquid ejecting head with an electrical signal corresponding to a recording signal corresponding to a liquid to be ejected.

It is still another object of the present invention to provide, as a more practical head, a liquid ejecting head capable of ejecting liquids in different conditions, comprising an ejection outlet for ejecting a liquid, a liquid flow path including a first liquid flow path for supplying the liquid to the ejection outlet, and a second liquid flow path having bubble generation heat means used to eject the liquid and capable of selectively generating bubbles having different sizes, and a movable mechanism having at least one movable member arranged to face a bubble generation region formed in the second liquid flow path by the bubble generation heat means, the movable member having a free end on a downstream side with respect to a direction of the ejection outlet, and a supporting member on an upstream side, and being displaced by generation of the bubble in a direction to move the free end in a substantially sealed state with respect to the first liquid flow path and to open the bubble generation region to the ejection outlet.

As described above, according to the ejecting method, liquid ejecting head, and the like of the present invention, which have a plurality of heat generating elements and movable members with respect to a liquid flow path, gradation images with high stability and high ejection direction precision can be realized, and images with very high quality can be obtained owing to the movable members.

The head cartridge of the present invention comprises a liquid ejection head as set forth either in claim 1 or 35 and a liquid container for containing liquid to be supplied to said liquid ejection head.

The liquid ejection apparatus of the present invention comprises a liquid ejection head as set forth either in claim 1 or 35 and a drive signal supplying means for supplying a drive signal for causing said liquid ejection head to eject the liquid.

The recording system of the present invention comprises a liquid ejection apparatus as set forth in claim 40 and an additional process device for promoting the fixation of the liquid on the recorded recording medium.

The recording system of the present invention comprises a liquid ejection apparatus as set forth in claim 40 and an preliminary process device for promoting the fixation of the liquid on the recorded recording medium.

In addition, gradation is realized by ejection amount modulation, and excellent ejection characteristics such as refilling characteristics can be maintained.

Furthermore, with the above effects, images such as curves and oblique lines can be realized with smooth lines, and the quality of images such as characters and graphic patterns can be improved.

Similarly, with the above effects, since the ejection reliability can be improved, pre-ejection immediately before a print operation can be performed with a very small number of times of liquid ejection within a short period of time.

Other features and advantages of the present invention will be apparent from the following description in conjunction with the preferred embodiments.

In this specification, "upstream" and "downstream" are defined with respect to a general liquid flow from a liquid supply source to the ejection outlet through the bubble generation region (movable member) or with respect to the structural direction.

With regard to a bubble itself, "downstream" mainly represents the ejection outlet side of the bubble which directly functions to eject a liquid droplet. More specifically, it generally means the downstream side of the center of the bubble with respect to the direction of the general liquid flow or the structural direction, or a bubble generated in a region on the downstream side of the center of the area of the heat generating element.

In this specification, "substantially sealed" generally means a sealed state in which when a bubble grows, the bubble does not escape through a gap (slit) around the movable member before it is displaced.

In this specification, "partition wall" may mean a wall (which may include a movable member) interposed to separate a bubble generation region from a region directly communicating with an ejection outlet, and more specifically means a wall separating a flow path including a bubble generation region from a liquid flow path directly communicating an ejection outlet to prevent mixing of the liquids in the respective regions.

DETAILED DESCRIPTION OF THE PREFERRED EMBODIMENTS

<Operation Principle>

The basic operation principle of the present invention will be described below with reference to the accompanying drawings.

Figure 1A:
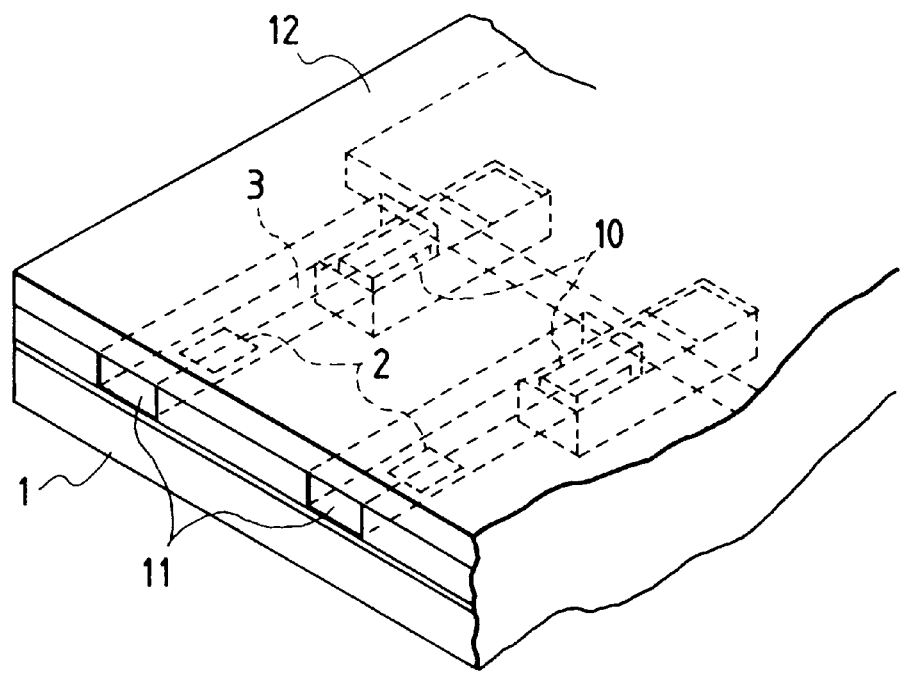
FIGS. 1A and 1B are views for explaining the liquid flow path structure of a conventional liquid ejecting head.
Figure 1B:
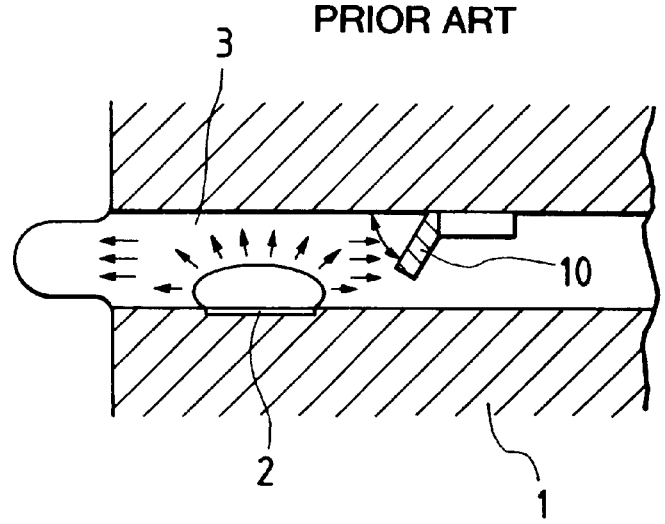
Figure 2A:
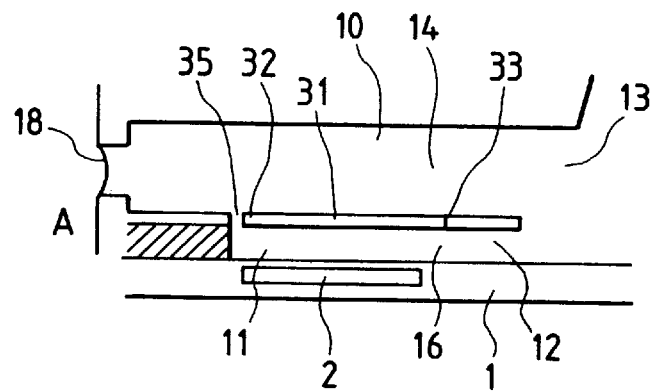
FIGS. 2A to 2D are sectional views for explaining the liquid ejection principle on which the present invention is based.
Figure 2B:
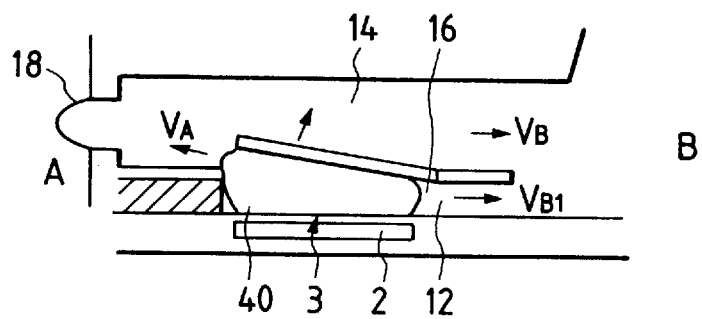
Figure 2C:
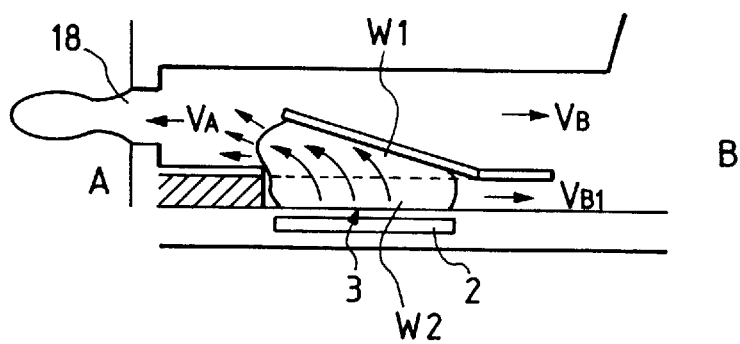
Figure 2D:
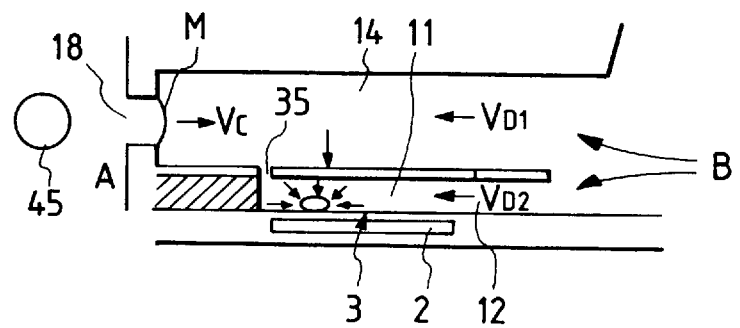
Figure 3:
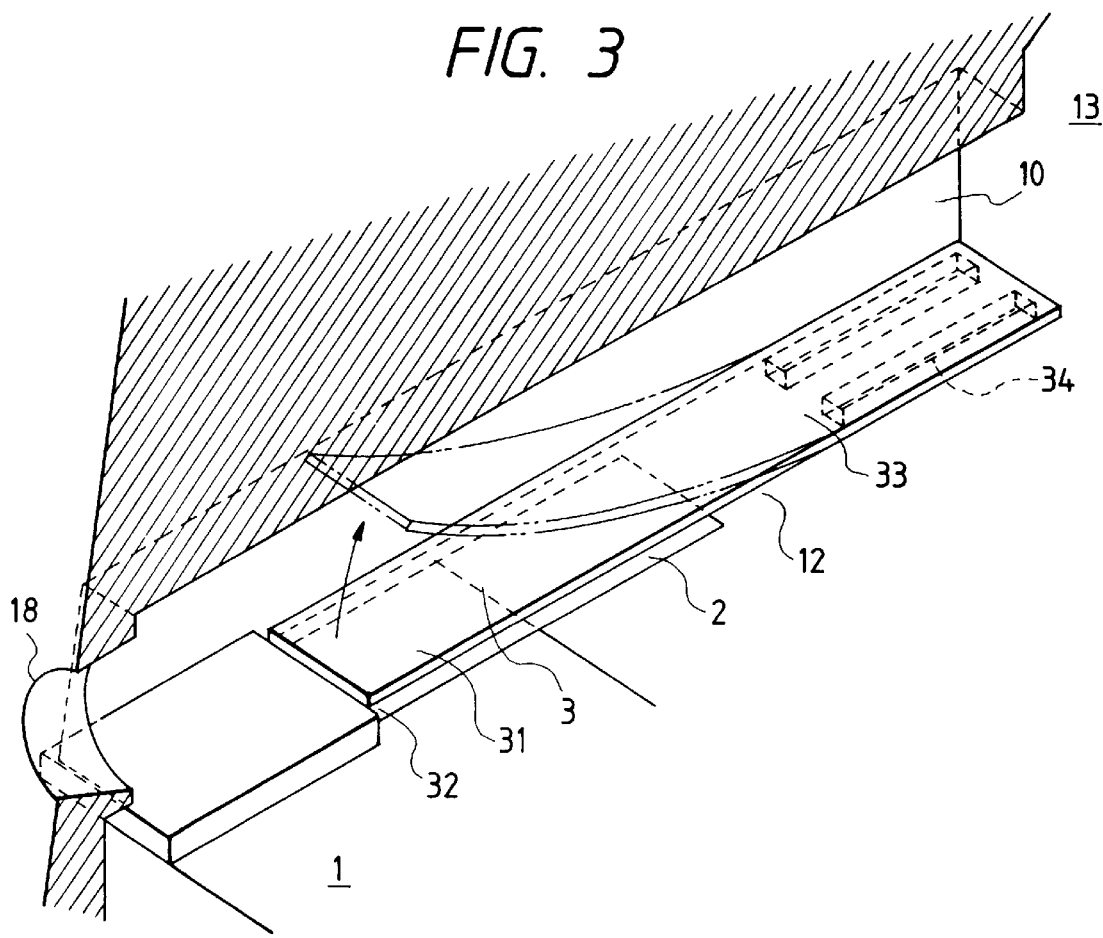
FIG. 3 is a partly cutaway perspective view of a liquid ejecting head in FIGS. 2A to 2D.

FIGS. 2A to 2D are schematic sectional views of a liquid ejecting head taken along a liquid flow path, and FIG. 3 is a partly cutaway perspective view of the liquid ejecting head.

The liquid ejecting head in FIGS. 2A to 2D comprises a heat generating element 2 (a heat generating resistor of 40 $\mu$m×105 $\mu$m in FIGS. 2A to 2D) as the ejection energy generating element for supplying thermal energy to the liquid to eject the liquid, an element substrate 1 on which the heat generating element 2 is formed, and a liquid flow path 10 formed above the element substrate correspondingly to the heat generating element 2. The liquid flow path 10 is in fluid communication with a plurality of the ejection outlets 18 and a common liquid chamber 13 for supplying the liquid to a plurality of such liquid flow paths 10. The liquid flow path 10 receives, from the common liquid chamber, a liquid in an amount corresponding to the amount of liquid discharged from the ejection outlets 18.

Above the element substrate in the liquid flow path 10, a movable member or plate 31 in the form of a cantilever of an elastic material such as a metal is provided facing the heat generating element 2. One end of the movable member 31 is fixed to a foundation (supporting member) 34 or the like provided by patterning of a photosensitive resin material on the wall of the liquid flow path 10 or the element substrate. By this structure, the movable member is supported, and a fulcrum (fulcrum portion) 33 is constituted.

The movable member 31 is so positioned that it has a fulcrum (fulcrum portion which is a fixed end) 33 in an upstream side with respect to a large flow of the liquid by the ejecting operation from the common liquid chamber 13 toward the ejection outlet 18 through the movable member 31 and that it has a free end (free end portion) 32 in a downstream side of the fulcrum 33. The movable member 31 is spaced apart from the heat generating element 2 by a distance of about 15 pm as if it covers the heat generating element 2. A bubble generation region is constituted between the heat generating element and movable member. The type, shape or position of the heat generating element or the movable member is not limited to the ones described above, but may be changed as long as the growth of the bubble and the propagation of the pressure can be controlled. For the purpose of easy understanding of the flow of the liquid which will be described hereinafter, the liquid flow path 10 is divided by the movable member 31 into a first liquid flow path 14 which is directly in communication with the ejection outlet 18 and a second liquid flow path 16 having a bubble generation region 11 and a liquid supply path 12.

By causing heat generation of the heat generating element 2, the heat is applied to the liquid in the bubble generation region 11 between the movable member 31 and the heat generating element 2, thereby generating a bubble on the basis of the film boiling phenomenon as disclosed in U.S. Pat. No. 4,723,129. The bubble and the pressure caused by the generation of the bubble act preferentially on the movable member, so that the movable member 31 moves or displaces to widely open toward the ejection outlet side about the fulcrum 33, as shown in FIGS. 2B and 2C or in FIG. 3. By the displacement of the movable member 31 or the state after the displacement, the propagation of the pressure caused by the generation of the bubble and the growth of the bubble per se are directed toward the ejection outlet.

Here, one of the fundamental ejection principles which is applied to the present invention will be described. One of the important principles in the present invention is that the movable member positioned facing the bubble is displaced from the first position in the steady state to the second position of the displaced movable member on the basis of the pressure of the bubble generation or the bubble per se, and the displacing movable member 31 is effective to direct the pressure and/or the bubble per se toward the ejection outlet 18 (downstream) upon generation of the bubble.

Figure 4:
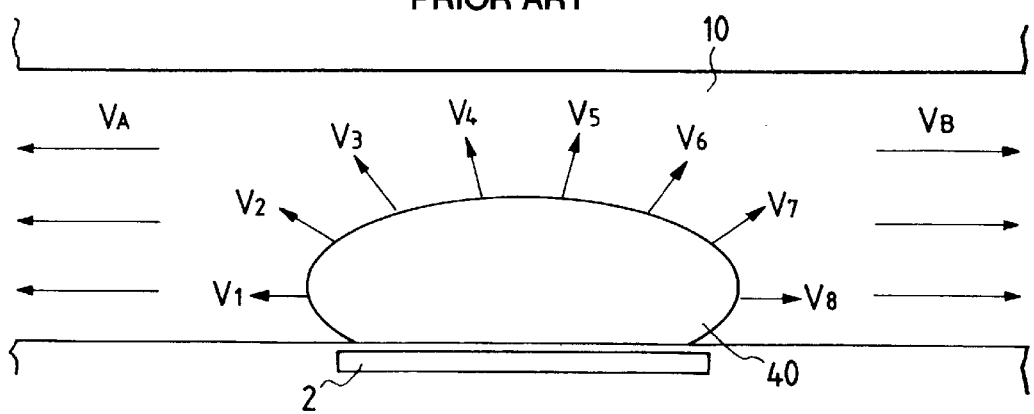
FIG. 4 is a sectional view for explaining the propagation of a pressure from a bubble in a conventional liquid ejecting head.
Figure 5:
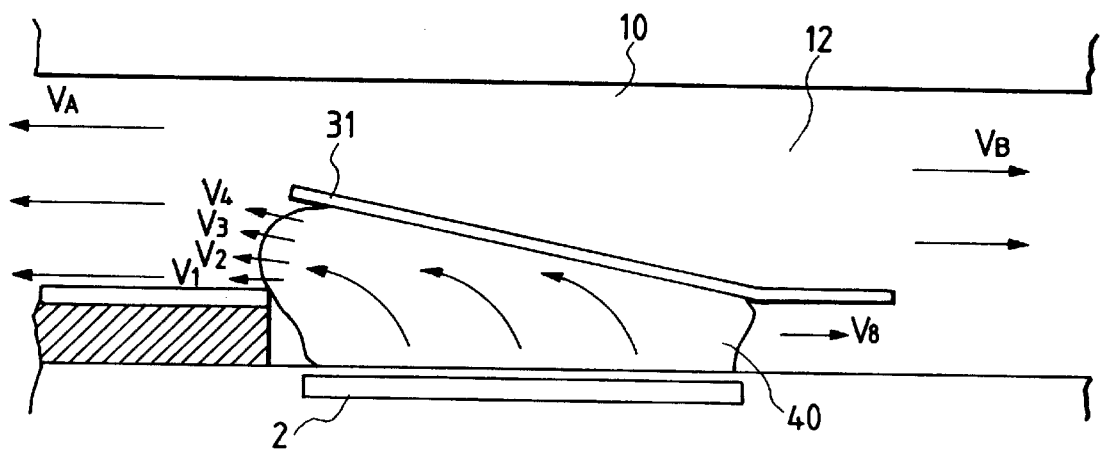
FIG. 5 is a sectional view for explaining the propagation of a pressure from a bubble in the liquid ejection principle on which the present invention is based.

A more detailed description will be made with comparison between the conventional liquid flow path structure not using the movable member (FIG. 4) and the present invention (FIG. 5). Here, the direction of propagation of the pressure toward the ejection outlet is indicated by $V_A$, and the direction of propagation of the pressure toward the upstream is indicated by $V_B$.

In a conventional head as shown in FIG. 4, there is not any structural element effective to regulate the direction of the propagation of the pressure produced by the bubble 40. Therefore, the directions of the pressure propagation of the bubble 40 are normal to the curved surface of the bubble as indicated by V1–V8. Among these directions, those of the pressure propagation of a portion closer to the ejection outlet (V1–V4) with respect to almost the half of the bubble have the pressure components in the $V_A$ direction which is most effective for the liquid ejection. This portion is important since it is directly contributable to the liquid ejection efficiency, the liquid ejection force, and the ejection speed. Furthermore, the component V1 is closest to the direction of $V_A$ which is the ejection direction, and therefore, is most effective, and the V4 has a relatively small component in the direction $V_A$.

On the other hand, in the present invention, as shown in FIG. 5, the movable member 31 is effective to direct, to the downstream (ejection outlet side), the pressure propagation directions V1–V4 of the bubble which otherwise are toward various directions. Thus, the pressure propagations of the bubble 40 are concentrated, so that the pressure of the bubble 40 is directly and efficiently contributable to the ejection.

The growth direction per se of the bubble is directed downstream similarly to the pressure propagation directions V1–V4, and grow more in the downstream side than in the upstream side. Thus, the growth direction per se of the bubble is controlled by the movable member, and the pressure propagation direction from the bubble is controlled thereby, so that the ejection efficiency, ejection force and ejection speed or the like are fundamentally improved.

Referring back to FIGS. 2A to 2D, the ejecting operation of the liquid ejecting head described above will be described in detail.

FIG. 2A shows a state before the energy such as electric energy is applied to the heat generating element 2, and therefore, no heat has yet been generated. It should be noted that the movable member 31 is so positioned as to face at least the downstream portion of the bubble generated by the heat generation of the heat generating element. In other words, in order that the downstream portion of the bubble acts on the movable member, the liquid flow path structure is such that the movable member 31 extends at least to the position downstream (downstream of a line passing through the center 3 of the area of the heat generating element and perpendicular to the longitudinal direction of the flow path) of the center 3 of the area of the heat generating element.

FIG. 2B shows a state wherein the heat generating element 2 generates heat upon application of the electric energy to the heat generating element 2, and a part of the liquid filled in the bubble generation region 11 is heated by this generated heat so that a bubble is generated as a result of film boiling.

At this time, the movable member 31 is displaced from the first position to the second position by the pressure produced by the generation of the bubble 40 so as to guide the propagation of the pressure toward the ejection outlet. It should be noted that, as described hereinbefore, the free end 32 of the movable member 31 is disposed on the downstream side (ejection outlet side), and the fulcrum 33 is disposed on the upstream side (common liquid chamber side), so that at least a part of the movable member faces the downstream portion of the bubble, that is, the downstream portion of the heat generating element.

FIG. 2C shows a state in which the bubble 40 has been further grown. By the pressure resulting from the bubble 40, the movable member 31 is displaced further. The generated bubble grows more downstream than upstream, and it expands greatly beyond the first position (broken line position) of the movable member. Thus, it is understood that in accordance with the growth of the bubble 40, the movable member 31 gradually displaces, so that the pressure propagation direction of the bubble 40, the direction in which the volume easily changes, namely, the growth direction of the bubble, are directed uniformly toward the ejection outlet, thereby increasing the ejection efficiency. When the movable member guides the bubble and the bubble generation pressure toward the ejection outlet, it hardly obstructs propagation and growth, and can efficiently control the propagation direction of the pressure and the growth direction of the bubble in accordance with the magnitude of the pressure.

FIG. 2D shows a state wherein the bubble 40 contracts and disappears by a decrease in pressure in the bubble upon film boiling. As shown in FIGS. 2B through 2D, displacement of the movable member 31 is dependent on the size of the bubble 40.

The movable member 31 having been displaced to the second position returns to the initial position (first position) of FIG. 2A by the restoring force provided by the spring properties of the movable member per se and the negative pressure due to the contraction of the bubble. Upon collapse of the bubble, the liquid flows back from the common liquid chamber side as indicated by $V_{D1}$ and $V_{D2}$ and from the ejection outlet side as indicated by $V_C$ so as to compensate for the volume reduction of the bubble in the bubble generation region 11 and to compensate for the volume of the ejected liquid.

In the foregoing, the description has been made as to the operation of the movable member with the generation of the bubble and the ejecting operation of the liquid. Now, a description will be made as to the refilling of the liquid in the liquid ejecting head to which the present invention is applicable.

When the bubble 40 enters the bubble collapsing process after the maximum volume thereof (FIG. 2C), the liquid having a volume enough to compensate for the volume of the collapsed bubble flows into the bubble generation region from the ejection outlet 18 side of the first liquid flow path 14 and from the bubble generation region of the second liquid flow path 16. In the conventional liquid flow path structure not having the movable member 31, the amount of the liquid from the ejection outlet side to the bubble collapse position and the amount of the liquid from the common liquid chamber thereinto, are determined by the flow resistances of the portion closer to the ejection outlet than the bubble generation region and the portion closer to the common liquid chamber (These amounts are determined based on the flow resistances and the inertia of the liquid).

Therefore, when the flow resistance on the supply path side is smaller than that on the other side, a large amount of the liquid flows into the bubble collapse position from the ejection outlet side, resulting in a meniscus retraction amount. In particular, with the reduction of the flow resistance in the ejection outlet for the purpose of increasing the ejection efficiency, the meniscus M retraction increases upon the collapse of the bubble, resulting in a longer refilling time period, and making high-speed printing difficult.

According to this structure, because of the presence of the movable member 31, the meniscus retraction stops at the time when the movable member returns to the initial position upon collapse of the bubble, and thereafter, the supply of the liquid in an amount corresponding to the volume W2 is accomplished by the flow $V_{D2}$ through the second flow path 16. In the prior art, a half the bubble volume W is the volume of the meniscus retraction, but according to this embodiment, only about ½ the volume W1 smaller than ½ the volume W is the volume of the meniscus retraction.

Additionally, the liquid supply for the volume W2 is forced to be effected mainly from the upstream ($V_{D2}$) of the second liquid flow path along the surface of the heat generating element side of the movable member 31 using the pressure upon collapse of the bubble, and therefore, a more speedy refilling action is accomplished.

When refilling using the pressure upon collapse of the bubble is carried out in a conventional head, the vibration of the meniscus increases to deteriorate the image quality. However, according to this embodiment, the flows of the liquid in the first liquid flow path 14 on the ejection outlet side and the ejection outlet side of the bubble generation region 11 are suppressed, so that the vibration of the meniscus is minimized.

Thus, according to the above structure applied to the present invention, the high-speed refilling is accomplished by the forced refilling to the bubble generation region thorough the liquid supply path 12 of the second flow path 16 and by the suppression of the meniscus retraction and vibration. Therefore, the stability of ejection and repeated high-speed ejections are accomplished, and when the embodiment is used in the field of recording, the image quality and high-speed recording can be improved.

The above structure also has the following effective function. It is suppression of the propagation of the pressure to the upstream side (back wave) produced by the generation of the bubble. Of all the bubbles generated on the heat generating elements 2, most of the pressure of the bubble on the common liquid chamber 13 side (upstream) becomes a force which pushes the liquid back to the upstream side (back wave). The back wave causes the pressure on the upstream side, the resultant liquid movement amount and the inertia force of the liquid movement, and degrades the refilling of the liquid into the liquid flow path. In this structure, these actions to the upstream side are suppressed by the movable member 31, so that the refilling performance is further improved.

A description will be made for a further characteristic feature and the advantageous effect.

The second liquid flow path 16 has a liquid supply path 12 having an inner wall substantially flush with the heat generating element 2 (the surface of the heat generating element is not greatly recessed) on the upstream side of the heat generating element 2. With this structure, the liquid is supplied to the surface of the heat generating element 2 and the bubble generation region 11 along the surface of the movable member 31 at the position closer to the bubble generation region 11 as indicted by $V_{D2}$. Accordingly, stagnation of the liquid on the surface of the heat generating element 2 is suppressed, so that precipitation of the gas dissolved in the liquid is suppressed, and the residual bubbles not disappearing are removed without difficulty, and in addition, the heat is not excessively accumulated in the liquid. Therefore, the stable bubble generation can be repeated at a high speed. In this structure of, the liquid supply path 12 has a substantially flat inner wall, but is not limited to this, and the liquid supply path is satisfactory if it has an inner wall smoothly extended from the surface of the heat generating element so that the stagnation of the liquid on the heat generating element, and a turbulence in the supply of the liquid do not occur.

The liquid is supplied into the bubble generation region through a gap at a side portion (slit 35) of the movable member as indicated by $V_{D1}$. In order to direct the pressure upon the bubble generation further effectively to the ejection outlet, a large movable member covering the entire bubble generation region (covering the surface of the heat generating element) may be used, as shown in FIGS. 2A to 2D. When the flow resistance to the liquid between the bubble generation region 11 and the region of the first liquid flow path 14 close to the ejection outlet is increased upon returning the movable member to the first position, the flow of the liquid to the bubble generation region 11 along $V_{D1}$ can be suppressed. However, according to this head structure, since there is a flow $V_{D1}$ effective to supply the liquid to the bubble generation region, the supply performance of the liquid is greatly increased, and therefore, even if the movable member 31 covers the bubble generation region 11 to improve the ejection efficiency, the supply performance of the liquid is not deteriorated.

Figure 6:
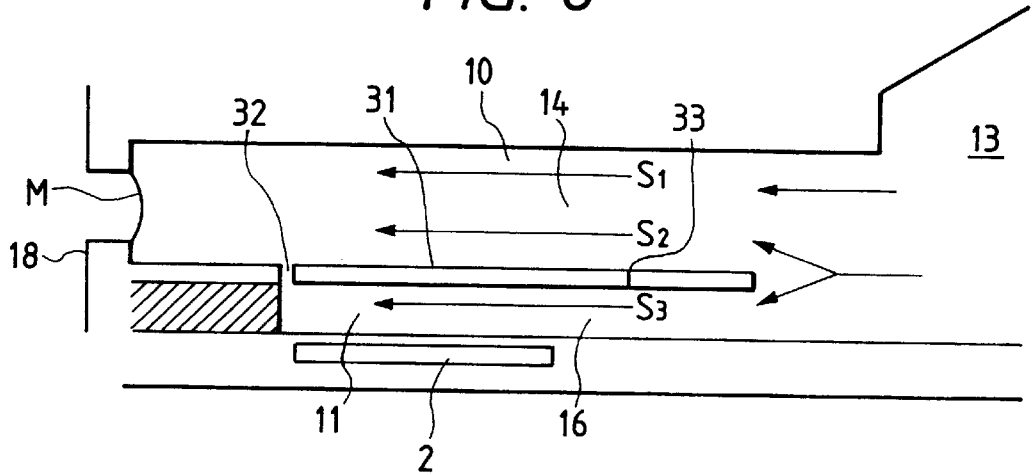
FIG. 6 is a sectional view showing the flow of a liquid in the liquid ejecting head on which the present invention is based.

The positional relationship between the free end 32 and the fulcrum 33 of the movable member 31 is such that the free end is at a downstream position of the fulcrum as indicated in FIG. 6, for example. With this structure, the function and effect of guiding the pressure propagation direction and the direction of the growth of the bubble to the ejection outlet side or the like can be efficiently assured upon the bubble generation. Additionally, this positional relationship is effective to accomplish not only the function or effect related to the ejection but also the reduction of the flow resistance of the liquid flowing through the liquid flow path 10 upon the supply of the liquid, thus permitting the high-speed refilling. When the meniscus M retracted by the ejection as shown in FIG. 6, returns to the ejection outlet 18 by capillary force or when the liquid is supplied to compensate for collapse of the bubble, the positions of the free end and the fulcrum 33 are located not to interfere with the flows $S_1$, $S_2$ and $S_3$ through the liquid flow path 10 including the first liquid flow path 14 and the second liquid flow path 16.

More particularly, in this structure, as described hereinbefore, the free end 32 of the movable member 3 faces the downstream position of the center 3 of the area which divides the heat generating element 2 into an upstream region and a downstream region (the line passing through the center (central portion) of the area of the heat generating element and perpendicular to the longitudinal direction of the liquid flow path). The movable member 31 receives the pressure and the bubble which are greatly contributable to the ejection of the liquid at the downstream side of the area center position 3 of the heat generating element, and it guides the force to the ejection outlet side, thus fundamentally improving the ejection efficiency or the ejection force.

Further advantageous effects are provided using the upstream side of the bubble, as described hereinbefore.

Furthermore, it is considered that in this structure, the instantaneous mechanical movement of the free end of the movable member 31 contributes to the ejection of the liquid.

(Embodiment)

Figure 7:
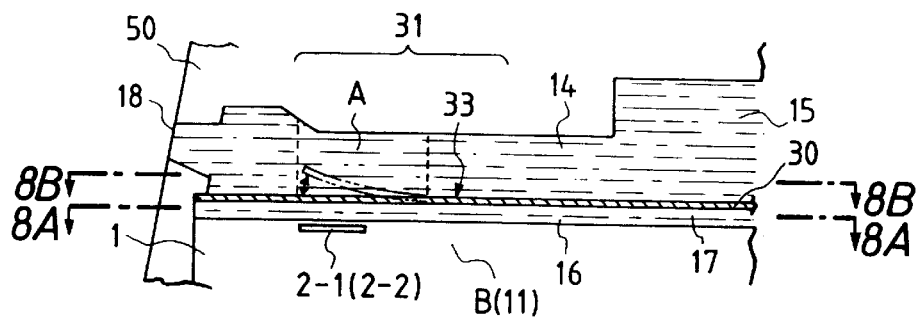
FIG. 7 is a longitudinal sectional view of the liquid ejecting head of the present invention.
Figure 8A:
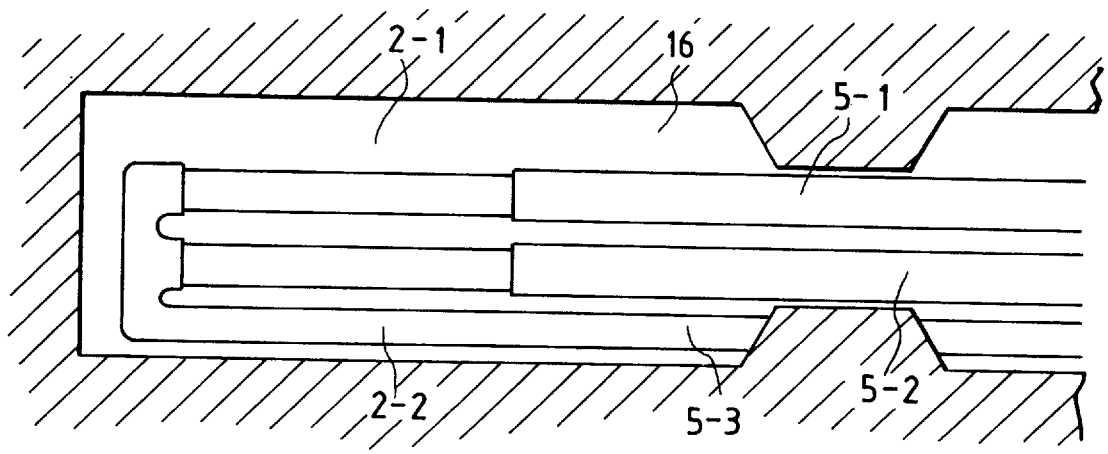
FIGS. 8A and 8B are sectional views for explaining an example of the arrangement of a movable member and two heat generating elements in the first embodiment of the present invention.
Figure 8B:
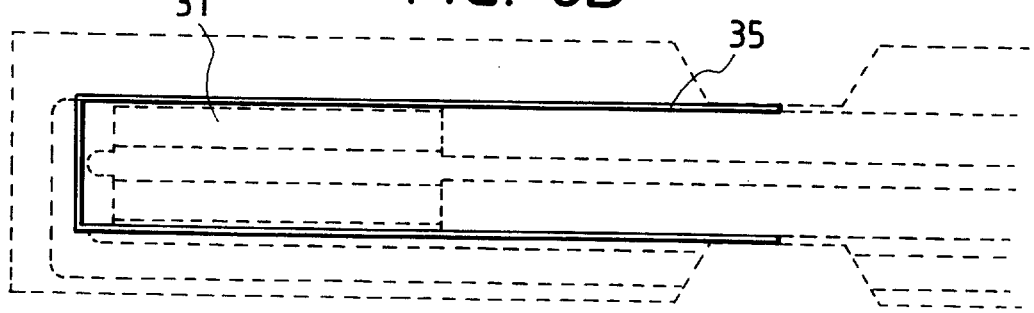

FIG. 7 is a sectional view of a liquid flow path of a liquid ejecting head according to the first embodiment of the present invention. FIG. 8A is a sectional view showing a sectional structure taken along a line 8A—8A in FIG. 7 and viewed from a direction A. FIG. 8B is a sectional view showing a sectional structure taken along a line 8B—8B in FIG. 7 and viewed from a direction B.

As shown in FIGS. 7 to 8B, the liquid ejecting head of the present invention has an element substrate 1 on which a plurality of (two in this embodiment) electrothermal transducers (to be referred to as heat generating elements hereinafter) 2-1 and 2-2, and wiring electrodes 5-1, 5-2, and 5-3 are formed. "Heat means" comprises a plurality of heat generating elements corresponding to one ejection outlet. This is the same in the other embodiments as shown hereinafter. The heat generating elements are arranged in the ejection outlet array direction and used to apply thermal energy to a liquid to generate bubbles. At least one of the heat generating elements can be driven independently. The wring electrodes serve to apply electrical signals to the heat generating elements. A second liquid flow path (bubble generation liquid flow path) 16 is arranged above the element substrate 1, and a first liquid flow path (ejection liquid flow path) 14 directly communicating with an ejection outlet 18 is arranged above the second liquid flow path. The upstream side of the first liquid flow path 14 communicates with a first common liquid chamber 15 for supplying the ejection liquid to a plurality of first liquid flow paths. The upstream side of the second liquid flow path 16 communicates with a second common liquid chamber 17 for supplying the bubble generation liquid to a plurality of second liquid flow paths. A partition wall 30 consisting of an elastic material such as a metal and having a movable member 31 formed thereon is arranged between the first and second liquid flow paths to separate the ejection liquid in the first liquid flow path 14 from the bubble generation liquid in the second liquid flow path 16. When the bubble generation liquid and the ejection liquid are not to be mixed with each other, the first liquid flow path 14 is preferably separated from the second liquid flow path 16 as perfectly as possible by using this partition wall. If, however, the bubble generation liquid and the ejection liquid are the same, or no problem is posed when the liquids are mixed with each other to some extent, the partition wall need not have a perfect separation function. Referring to FIG. 7, a grooved member 50 is a member obtained by integrally forming the wall of the first liquid flow path 14 and the ejection outlet 18. The grooved member 50, the element substrate 1, and the partition wall 30 constitute the liquid ejecting head.

A portion of the partition wall located in a projection space (to be referred to as an ejection pressure generation region hereinafter; a region A and a region B as a bubble generation region 11 in FIG. 11) above the surfaces of the heat generating elements 2-1 and 2-2 serves, with a slit 35, as the movable member 31 in the form of a cantilever, which has a free end on the ejection outlet side (the downstream side of the flow of the liquid flowing to the ejection outlet), and a fulcrum 33 on the common liquid chamber (15, 17) side (the downstream side of the flow of the liquid flowing to the ejection outlet). Since this movable member 31 is arranged to face the bubble generation region 11 (B), the member operates to open toward the ejection outlet side of the first liquid flow path upon generation of a bubble (in the direction indicated by the arrow in FIG. 7). In this case, by changing the drive conditions for the heat generating elements 2-1 and 2-2, the state of the bubble generated by the elements and the displacement amount of the movable member are changed, and hence the liquid ejection amount can be changed.

The structural relationship between the liquid supply path 12 and the heat generating element 2 has been described above. This structural relationship is the same as that between the second liquid flow path 16 and a heat generating element 2 in this embodiment. In this embodiment, the second liquid flow path 16 comes to a dead end on the downstream side from the heat generating elements.

The operation of this head will be described next with reference to FIGS. 9 to 11. One of the characteristic features of the operation of the head of this embodiment is that gradation control can be performed.

For the sake of easy understanding of the present invention, the same water-based ink is used as an ejection liquid to be supplied to the first liquid flow path 14 and a bubble generation liquid to be supplied to the second liquid flow path 16.

Figure 9:
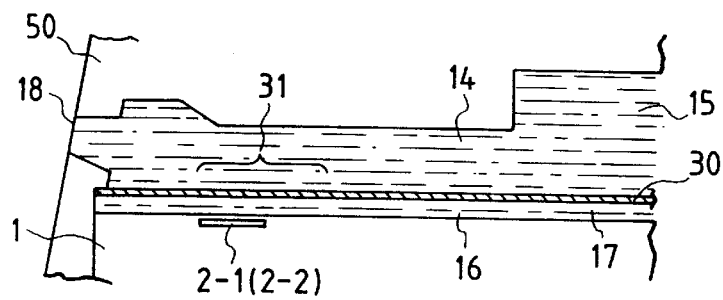
FIG. 9 is a sectional view showing a driven state of the liquid ejecting head of the present invention.

FIG. 9 shows a state wherein both the heat generating elements 2-1 and 2-2 are OFF. In this case, the movable member 31 formed on the partition wall 30 undergoes no deformation, and the ejection amount is zero.

Figure 10:
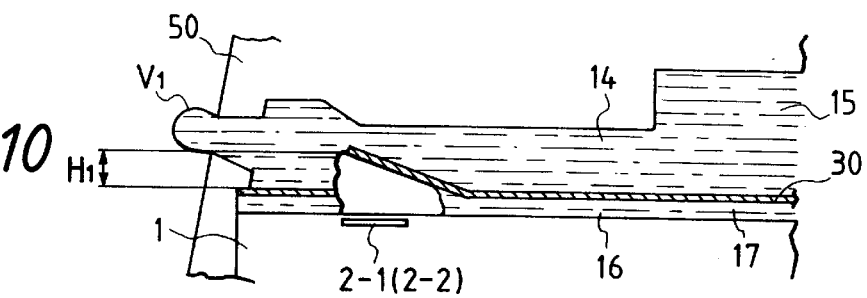
FIG. 10 is a sectional view showing a driven state of the liquid ejecting head of the present invention.

FIG. 10 shows a state wherein only the heat generating element 2-1 of the heat generating elements 2-1 and 2-2 is set in the ON state upon application of a driving signal (pulse) with a voltage 24 V and a pulse width of 5 $\mu$s. The film boiling as disclosed in Japanese Patent Publication No. 61-59914 is caused by making the heat generated by the heat generating element 2-1 act on the bubble generation liquid filling the second liquid flow path 16, thereby generating a bubble. The movable member 31 is raised by bubble generation energy (pressure) at this time, so that the movable end of the movable member 31 displaces in the first liquid flow path 14 by an amount H1. The bubble enters the first liquid flow path 14 filled with the ejection ink through a gap corresponding to the amount H1. As a result, the bubble pressure wave mainly ropagates toward the ejection outlet side of the first liquid flow path 14 to eject the ink by an ink amount V1.

Figure 11:
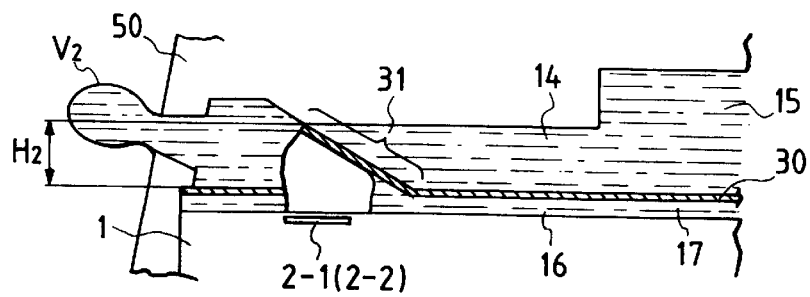
FIG. 11 is a sectional view showing a driven state of the liquid ejecting head of the present invention.

FIG. 11 shows a state wherein both the heat generating elements 2-1 and 2-2 are set in the ON state upon application of the same driving signal as that described above so as to heat the ink and generate a bubble. The bubble generation energy is larger than that in the case shown in FIG. 10. This bubble generation energy acts to raise the movable end of the movable member 31 by an amount H2. The displacement amount of the movable member 31 becomes the maximum amount. The bubble generated in the bubble generation region enters the first liquid flow path 14 filled with the ejection ink through a gap corresponding to the amount H2 to eject the ink by a maximum ejection amount V2.

Although not shown, when the heater sizes of the heat generating elements 2-1 and 2-2 are changed, and only the heat generating element 2-2 serves to generate a bubble, since the displacement amount of the movable member 31 is different from the amounts H1 and H2, an ejection amount different from the amounts V1 and V2 can be obtained.

As described above, according to the present invention, by changing the number or positions of heat generating elements to be driven, the displacement state of the movable member 31, e.g., the displacement amount, is changed to eject liquid droplets in different amounts.

In the present invention, the ink can be ejected with higher ejection energy efficiency and a higher ejection pressure than in the conventional head owing to the above principle that the displacement of the movable member guides a bubble to the ejection outlet and the synergistic effect of such phenomena.

As described above, with a plurality of heat generation elements arranged for one nozzle or movable member, and a combination of ON and OFF operations of the respective heat generating elements, the displacement amount of the movable member 31 can be controlled.

With this operation, the ejection amount of ink from the first liquid flow path 14 can be controlled. As a result, recorded information can be expressed with gradation.

With a plurality of heat generating elements, therefore, gradation expression can be attained.

Table 1 shows the relationship between the ejection amount and a combination of ON and OFF operations of the respective heat generating elements of the head of this embodiment.

The liquid ejecting head used in this embodiment is the one shown in FIGS. 7 to 11. This head had a plurality of ejection outlets, each having a diameter of 34 $\mu$m, arranged at a pitch of 70.5 $\mu$m. The heat generating elements 2-1 and 2-2 had the same size of 18 $\mu$m×100 $\mu$m. The drive conditions were: a voltage of 24 V, a pulse width of 5 $\mu$s, and a driving frequency of 200 Hz. In obtaining an ejection amount, the total amount of ink ejected 20,000 times in the driving mode of each heat generating element was divided by the number of times of ejection to obtain an average value. In this embodiment, the same water-based ink was used as a bubble generation liquid and an ejection liquid.

TABLE 1

| | ON/OFF Operations of Heat Generating Elements | | Ejection Amount |
|---|---|---|---|
| | 2-1 | 2-2 | (ng) |
| (a) | OFF | OFF | 0 |
| (b) | ON | OFF | 40 |
| (c) | ON | ON | 80 |

(a) When both the heat generating elements 2-1 and 2-2 were OFF, the displacement amount of the movable member 31 was 0, and hence the ejection amount was also 0.

(b) When only the heat generating element 2-1 is ON, the ejection amount was 40 ng.

(c) When both the heat generating elements 2-1 and 2-0 were ON, the displacement amount of the movable member 31 was larger than that obtained when the only the heat generating element 2-1 was ON, and the ejection amount was 80 ng.

Figure 12:
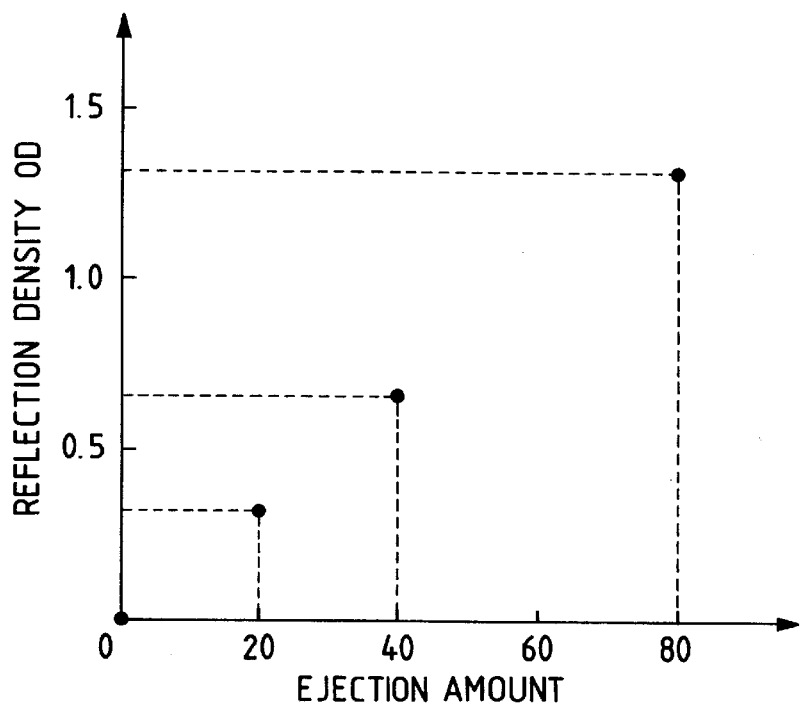
FIG. 12 is a graph showing the relationship between the ejection amount and the reflection density.

Referring to FIG. 12, the images formed in such ejection amounts are represented by the reflection densities.

Since the reflection density is proportional to the ejection amount of ink, if the ejection amount of ink can be changed in four steps by combining ON/OFF operations of the two heat generating elements, reflection densities corresponding to four gradation levels can be obtained, as shown in FIG. 12.

In the present invention, with the movable members, since the liquid ejection efficiency and ejection force are higher than those of the conventional liquid ejecting head as described above, even if small droplets are repeatedly ejected, stable ejection can be performed in a gradation recording operation performed by changing the ejection amount.

Figure 13A:
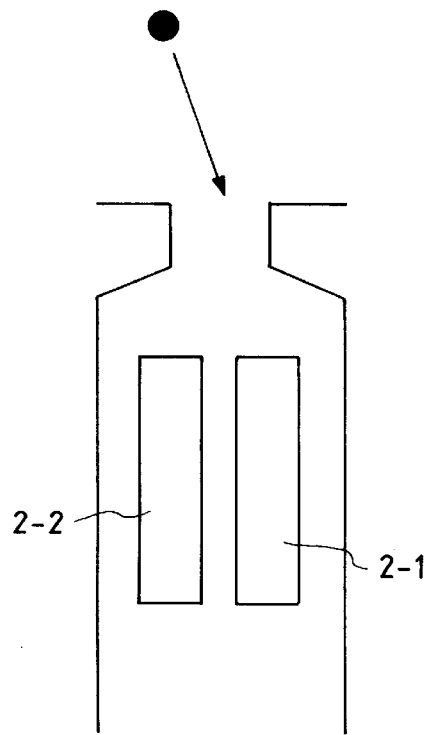
FIGS. 13A and 13B are views for explaining liquid ejection directions in a conventional liquid ejecting head.
Figure 13B:
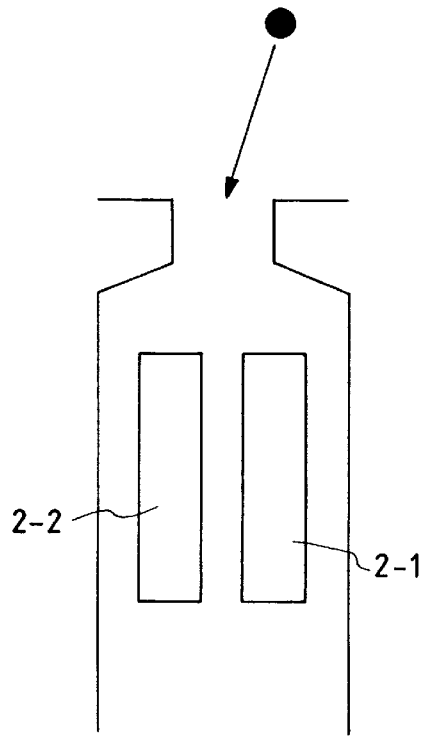

In addition, as described above, since high speed refilling can be accomplished by the operations of the movable members, the liquid ejecting head of the present invention can be driven at a high speed. Furthermore, in the conventional liquid ejecting head, when heat generating elements are driven independently, the ejection direction may change. FIGS. 13A and 13B show such a state. FIG. 13A shows a case wherein the heat generating element 2-1 on the right side with respect to the ejection outlet is driven. In this case, the liquid is ejected from the ejection outlet to the left side. As shown in FIG. 13B, when the heat generating element 2-2 on the left side with respect to the ejection outlet is driven, the liquid is ejected to the right side. In the liquid ejecting head of the present invention, with the movable member 31, even if heat generating elements are driven independently, the bubble generation power is guided to the center of the ejection outlet to stabilize liquid ejection in terms of ejection direction regardless of the position of a heat generating element with respect to the liquid flow path. As described above, according to the present invention, since small droplets can be stably ejected at a high ejection frequency, high-quality gradation recording can be performed at a high speed.

Figure 14A:
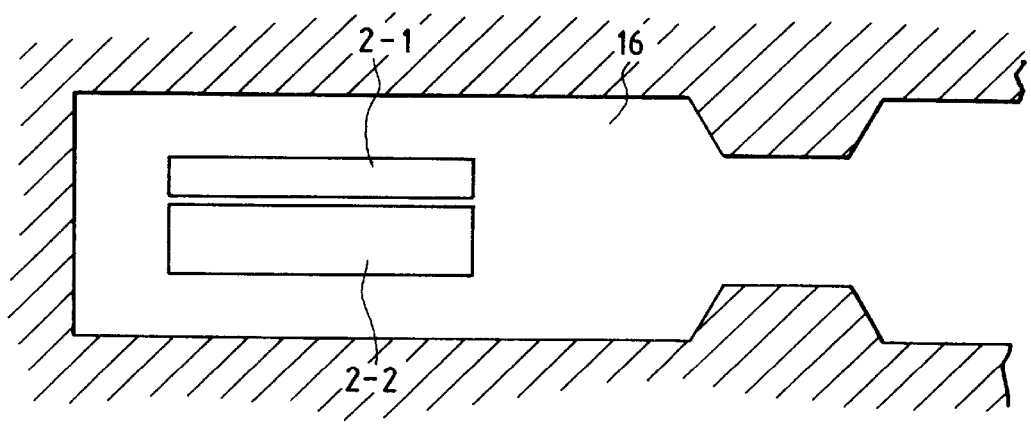
FIGS. 14A and 14B are sectional views for explaining an example of the arrangement of a movable member and three heat generating elements in the second embodiment of the present invention.
Figure 14B:
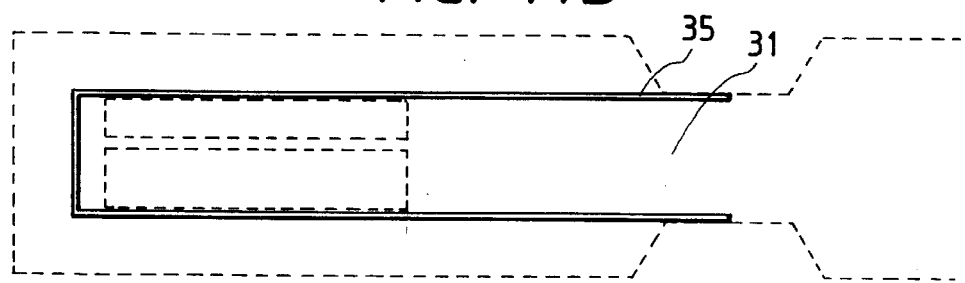
Figure 18A:
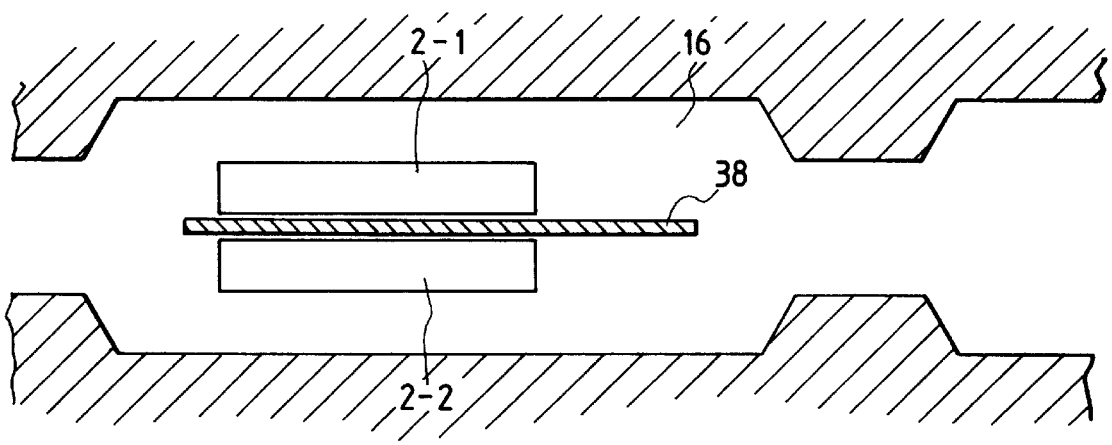
FIGS. 18A and 18B are sectional views for explaining an example of the arrangement of a plurality of movable members, a plurality of heat generating elements, and a partition wall in the sixth embodiment of the present invention.
Figure 18B:
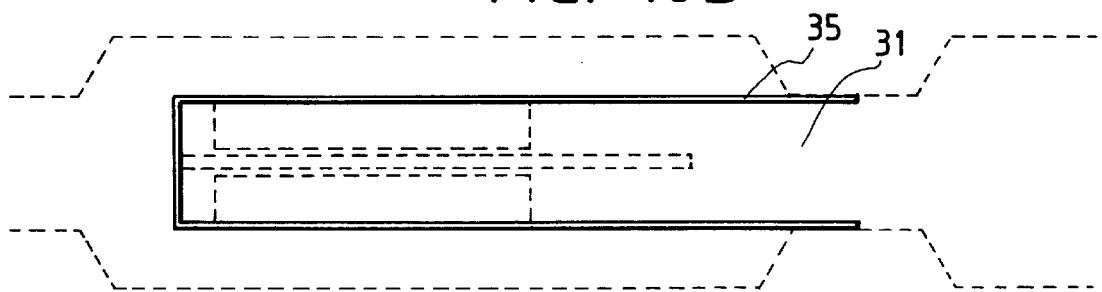

FIGS. 14A and 14B are sectional views of a liquid ejecting head according to the second embodiment of the present invention taken along the same directions as those of FIGS. 18A and 18B described above (illustration of wiring electrodes is omitted in FIGS. 14A and 14B). In the second embodiment, in order to eject smaller droplets, the two heat generating elements in the first embodiment have different shapes. In this embodiment, the size of a heat generating element 2-1 on the right side with respect to the ejection outlet is set to be 13 $\mu$m×100 $\mu$m, and a heat generating element 2-2 on the left side with respect to the ejection outlet is set to be 23 $\mu$m×100 $\mu$m. That is, the heat generating element on the right side is set to be larger than the one on the left side. Note that the size of each movable member is set to be 40 $\mu$m×210 $\mu$m.

With this structure, in addition to the effects of the first embodiment described above, the ejection amount obtained when only the heat generating element 2-1 is driven decreases, and hence smaller droplets can be ejected. Since the difference between the ejection amount obtained by the heat generating element having a larger area and the ejection amount obtained by the heat generating element having a smaller area is large, a larger gradation expression range can be obtained.

Figure 15A:
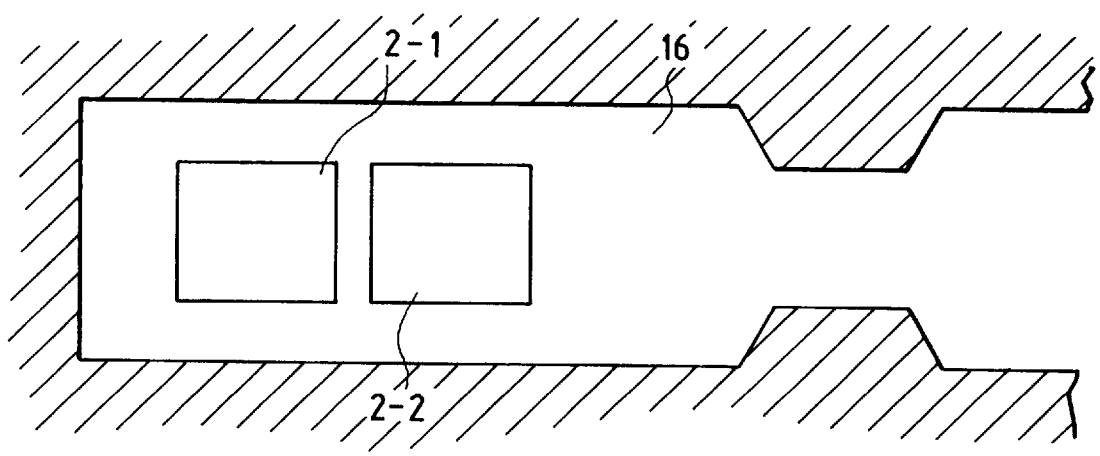
FIGS. 15A and 15B are sectional views for explaining an example of the arrangement of a plurality of movable members and a plurality of heat generating elements in the third embodiment of the present invention.
Figure 15B:
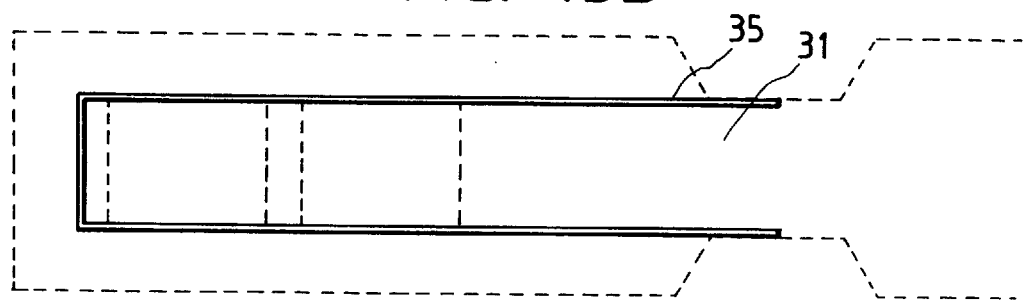

In this embodiment, the two heat generating elements are used, but three or more heat generating elements may be arranged along the ejection outlet arrangement direction. FIGS. 15A and 15B show the third embodiment of the present invention in which two heat generating elements of a liquid ejecting head are arranged along the direction of the flow of a liquid flowing to the ejection outlet with respect to a movable member 31. FIG. 15A is a sectional view equivalent to FIG. 14A. FIG. 15B is a sectional view equivalent to FIG. 14B. In this embodiment, two heat generating elements, each of which has a size of 40 $\mu$m×50 $\mu$m and can be driven independently, are arranged in a liquid flow path, and the movable member 31 having a size of 40 $\mu$m×210 $\mu$m is arranged therein. In this embodiment, the heat means also comprises a plurality of heat generating elements. In the embodiment as well, the deformation amount of the movable member 31 can be controlled by a combination of ON and OFF operations of the respective heat generating elements, and hence the ejection amount of ink can be controlled. Recorded information can therefore be expressed with gradation. In the embodiment, the heat generating elements are arranged along the direction of the flow of a liquid flowing to the ejection outlet. Owing to such an excellent layout, even if the width of the liquid flow path decreases with an increase in density in the liquid flow path, high-density gradation recording can be realized at a high speed.

In this embodiment as well, if the heat generating elements are made to have different shapes, the difference between the maximum and minimum ejection amounts can be increased, thereby further expanding the gradation expression range.

In addition, in this embodiment, the number of heat generating elements is set to be two. However, the present invention is not limited to this, and three or more heat generating elements may be arranged along the direction of the flow of a liquid flowing to the ejection outlet.

Figure 16A:
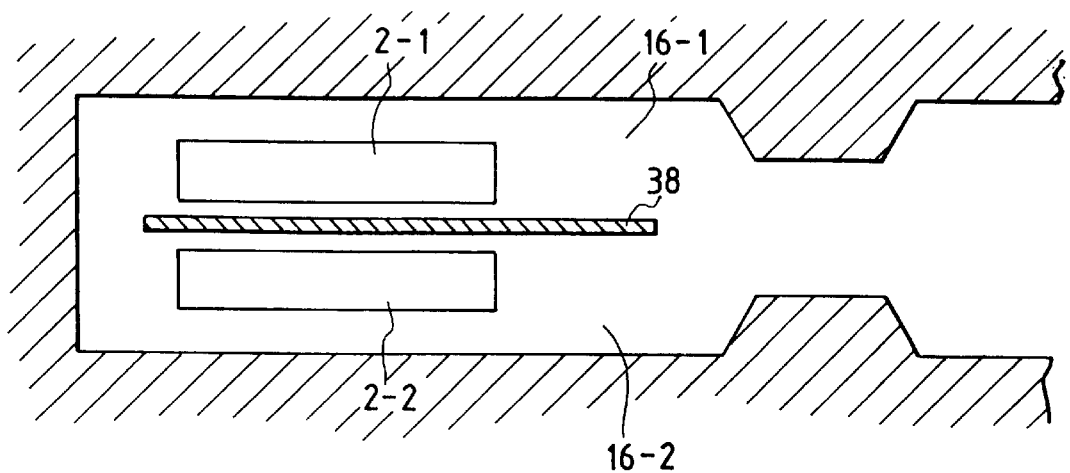
FIGS. 16A and 16B are sectional views for explaining another example of the arrangement of a plurality of movable members and a plurality of heat generating elements in the fourth embodiment of the present invention.
Figure 16B:
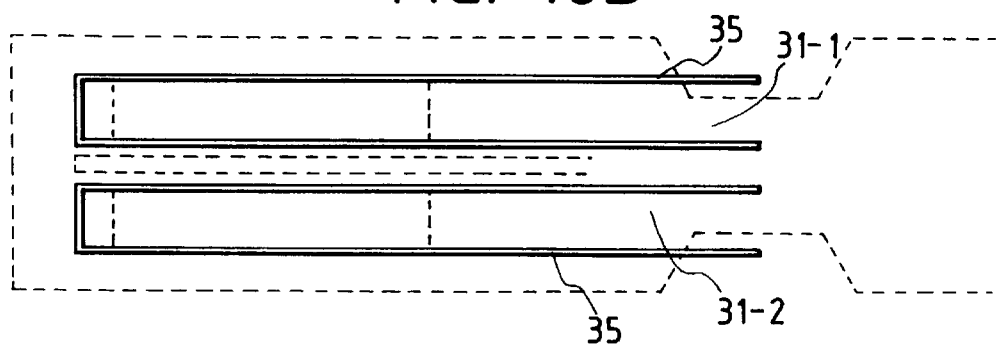

FIGS. 16A and 16B show the fourth embodiment of the present invention, in which a plurality of movable members 31 are arranged with respect to one first liquid flow path and one ejection outlet. FIG. 16A is a sectional view equivalent to FIG. 15A. FIG. 16B is a sectional view equivalent to FIG. 15B. In this embodiment, two heat generating elements, each of which has a size of 18 $\mu$m×100 $\mu$m and can be driven independently, are arranged in parallel, and two movable members 31 as moving mechanisms, each having a size of 20 $\mu$m×210 $\mu$m, are arranged at positions corresponding to the heat generating elements. In this embodiment, the heat means also comprises a plurality of heat generating elements. In addition, a partition wall is arranged in a second liquid flow path to separate the bubble generation regions formed by heat generating elements 2-1 and 2-2 from each other, thereby separating the second liquid flow path into two second liquid flow paths 16-1 and 16-2. When a bubble is generated in the liquid in the second liquid flow path in which the heat generating element 2-1 is driven, the movable member 31-1 is greatly displaced toward the first liquid flow path by the pressure generated upon generation of this bubble. As a result, the bubble grows toward the ejection outlet, and a predetermined amount of liquid is ejected from the ejection outlet by the pressure transferred to the first liquid flow path. When both the heat generating elements 2-1 and 2-2 are simultaneously driven, an ejection amount of liquid about twice that obtained when only the heat generating element 2-1 is driven can be obtained.

Table 2 shows the average ejection amounts obtained by using the liquid ejecting head of the second embodiment under the following conditions:

driving signal: voltage 24 V
 pulse width 5 $\mu$s
 driving frequency 200 Hz
using the same water-based ink as a bubble generation liquid and an ejection liquid.

In obtaining an ejection amount, the total amount of ink consumed when liquid ejection was performed 20,000 times in the driving mode of each heat generating element was divided by the number of times of ejection to obtain an average value.

TABLE 2

| | ON/OFF Operations of Heat Generating Elements | | Ejection Amount |
|---|---|---|---|
| | 2-1 | 2-2 | (ng) |
| (a) | OFF | OFF | 0 |
| (b) | ON | OFF | 40 |
| (c) | ON | ON | 80 |

In this embodiment, two different amounts of liquid could be ejected in a very stable state as compared with the prior art, and ternary gradation recording could be performed with good gradation characteristics at a high speed.

In addition, in this embodiment, since the second liquid flow path is divided into the two second liquid flow paths 16-1 and 16-2, when the heat generating elements are driven independently, escaping of the bubble pressure toward the second liquid flow path wall (two sides) can be prevented, thereby more efficiently displacing the movable members 31-1 and 31-2. Therefore, the ejection efficiency and the ejection force are further improved. As a result, the gradation stability can be further improved.

Since the bubble generation region formed by each heat generating element is partitioned off by the partition wall 38, bubble generating operations performed by the respective heat generating elements do not interfere with each other.

For this reason, a bubble generation pressure loss caused by a slight bubble generation timing offset (caused by bubble generation/extinction in the bubble jet scheme of increasing/ decreasing the pressure on the order of several $\mu$s to several tens $\mu$s) when the two heat generating elements are simultaneously driven can be reduced, and the uniformity of ejection characteristics between nozzles or in ejection by each nozzle can be improved.

In this embodiment, the two heat generating elements have the same size. However, these elements may have different sizes.

In addition, in this embodiment, the two movable members have the same size. However, these members may have different sizes.

Furthermore, in this embodiment, the respective movable members and heat generating elements are located at the same distance from the ejection outlet. However, these members may be located at different distances from the ejection outlet.

Figure 17A:
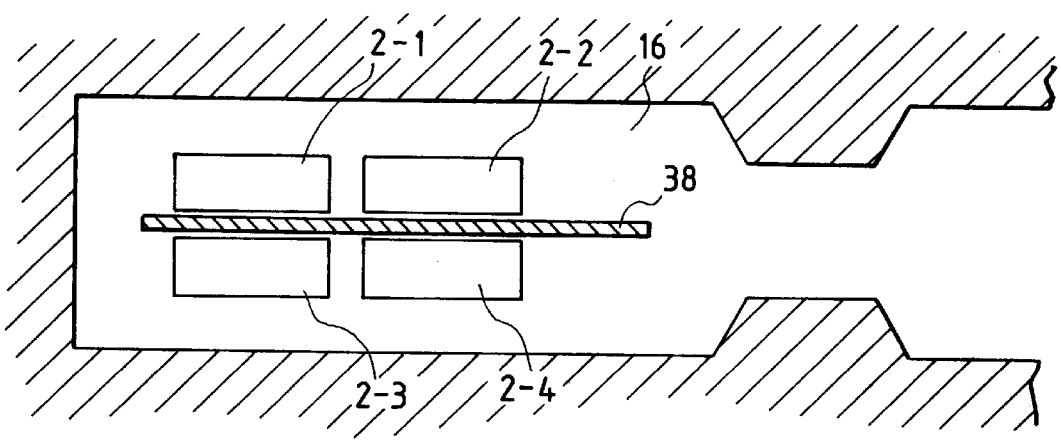
FIGS. 17A and 17B are sectional views for explaining still another example of the arrangement of a plurality of movable members and a plurality of heat generating elements in the fifth embodiment of the present invention.
Figure 17B:
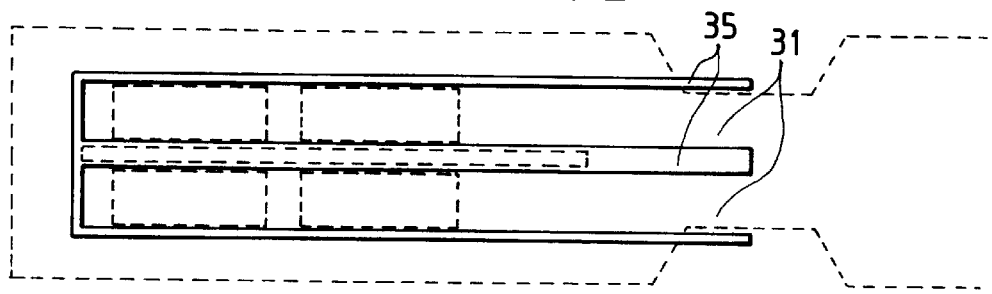

FIGS. 17A and 17B show the fifth embodiment of the present invention, in which a plurality of movable members 31 are arranged with respect to one first liquid flow path and one ejection outlet, and two heat generating elements are arranged along the direction of the flow of a liquid flowing to the ejection outlet in correspondence with the respective movable members. FIG. 17A is a sectional view equivalent to FIG. 16A. FIG. 17B is a sectional view equivalent to FIG. 16B. In this embodiment, two movable members 31, each having a size of 20 $\mu$m×210 $\mu$m, are arranged in a liquid flow path in parallel with respect to the direction of the flow of a liquid flowing to the ejection outlet, and two pairs of heat generating elements, each having a size of 18 $\mu$m×50 $\mu$m, are arranged along the direction of the flow of a liquid flowing to the ejection outlet in correspondence with the respective movable members.

A partition wall 38 is arranged to separate the two pairs of heat generating elements (2-1 and 2-2, and 2-3 and 2-4) arranged with respect to the respective movable members, and a common slit is formed between the respective movable members.

With this structure, similar to the fourth embodiment, when each heat generating element is driven, escaping of the pressure to the second liquid flow wall (two sides) can be prevented. Therefore, there is no pressure loss caused by a bubble generation timing offset when the respective heat generating elements are simultaneously driven, and hence movable members 31-1 and 31-2 can be displaced more efficiently and stably.

In addition, with the two pairs of heat generating elements arranged for the respective movable members, better gradation characteristics can be obtained.

Furthermore, with the common slit between the respective movable members, movable members can be arranged at a high density and manufactured more easily.

In this embodiment, the two heat generating elements are used with respect to the respective movable members. However, three or more heat generating elements may be used. Alternatively, the number of heat generating elements for the respective movable members may be changed, as needed.

FIGS. 18A and 18B show the sixth embodiment of the present invention, in which one movable member is arranged for one first liquid flow path and one ejection outlet, and two heat generating elements are separated from each other by a partition wall. FIG. 18A is a sectional view equivalent to FIG. 17A. FIG. 18B is a sectional view equivalent to FIG. 17B. In this embodiment, a movable member having a size of 40 $\mu$m×210 $\mu$m is arranged, and two heat generating elements, each having a size of 18 $\mu$m×100 $\mu$m, are arranged in the direction in which ejection outlet are arranged. In addition, a partition wall is arranged in a second liquid flow path to separate heat generating elements 2-1 and 2-2 from each other, so that the second liquid flow path is divided into two second liquid flow paths 16-1 and 16-2.

With this structure, similar to the fourth embodiment described above, when each heat generating element is driven, escaping of the pressure toward the second liquid flow path wall (two sides) can be prevented. With this effect and the like, each movable member 31 can be displaced efficiently and stably.

With the movable member 31, even when the heat generating elements are driven independently, the bubble generation power is guided to the center of the ejection outlet, thereby stabilizing liquid ejection in terms of ejection direction.

Each of the first to sixth embodiments of the present invention has exemplified the liquid ejecting head having a two-flow-path structure including the first and second liquid flow paths. However, the present invention is not limited to this. As is apparent, the present invention can be equally applied to a liquid ejecting head having a single flow path structure in which a flow path is not divided by a partition wall as in the structure shown in FIGS. 2A to 2D, 3, 5, or 6.

In the liquid ejecting head of each of the first to sixth embodiments, the liquid ejection efficiency and the ejection force are higher than those of the conventional liquid ejecting head. In addition, the ejection characteristics are stable, and the ejection direction precision is high, as described above. This effect is applied to a smoothing/recording technique of improving the quality of line drawings and the like so as to realize a higher smoothing effect.

Figure 19A:
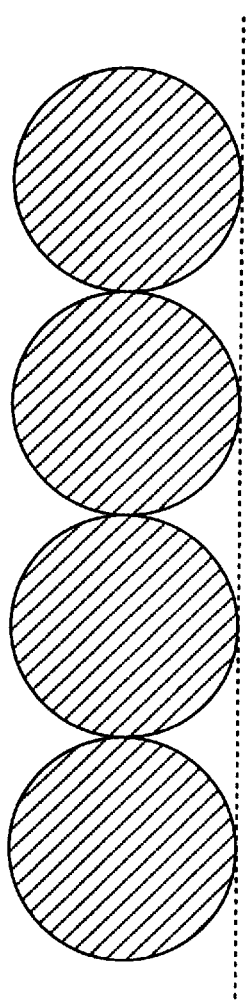
FIGS. 19A to 19C are views for explaining a smoothing effect in the present invention.
Figure 19B:
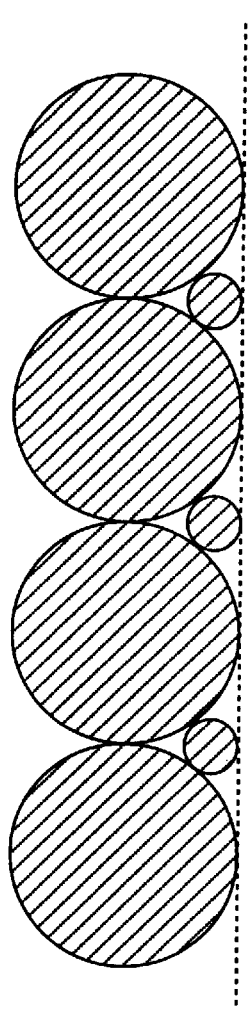
Figure 19C:
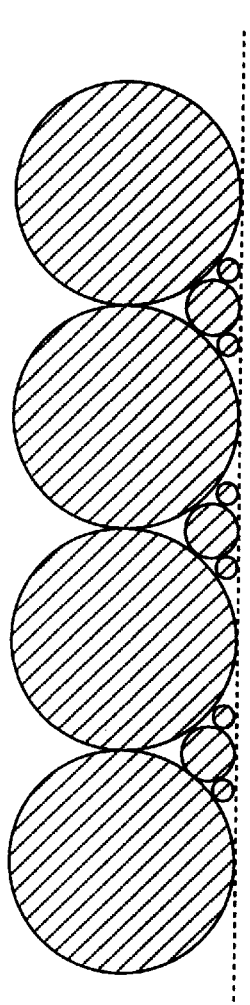

FIG. 19A shows a straight line recorded with the same ejection amount. FIGS. 19B and 19C show straight lines recorded with two different ejection amounts (large and small dots) and three different ejection amounts (large, intermediate, and small dots), respectively. By using two and three different ejection amounts, smoother straight lines an be recorded/expressed. It is difficult for the conventional liquid ejecting head to eject small droplets stably and properly at desired positions. In contrast to this, the liquid ejecting head of the present invention can stably ejection several different amounts of liquid, and have high precision in terms of ejection amounts and desired positions. For this reason, an effective smoothing operation can be performed.

With this effect, character and graphic pattern edges can be smoothly and reliably reproduced to improve the print quality.

Figure 20:
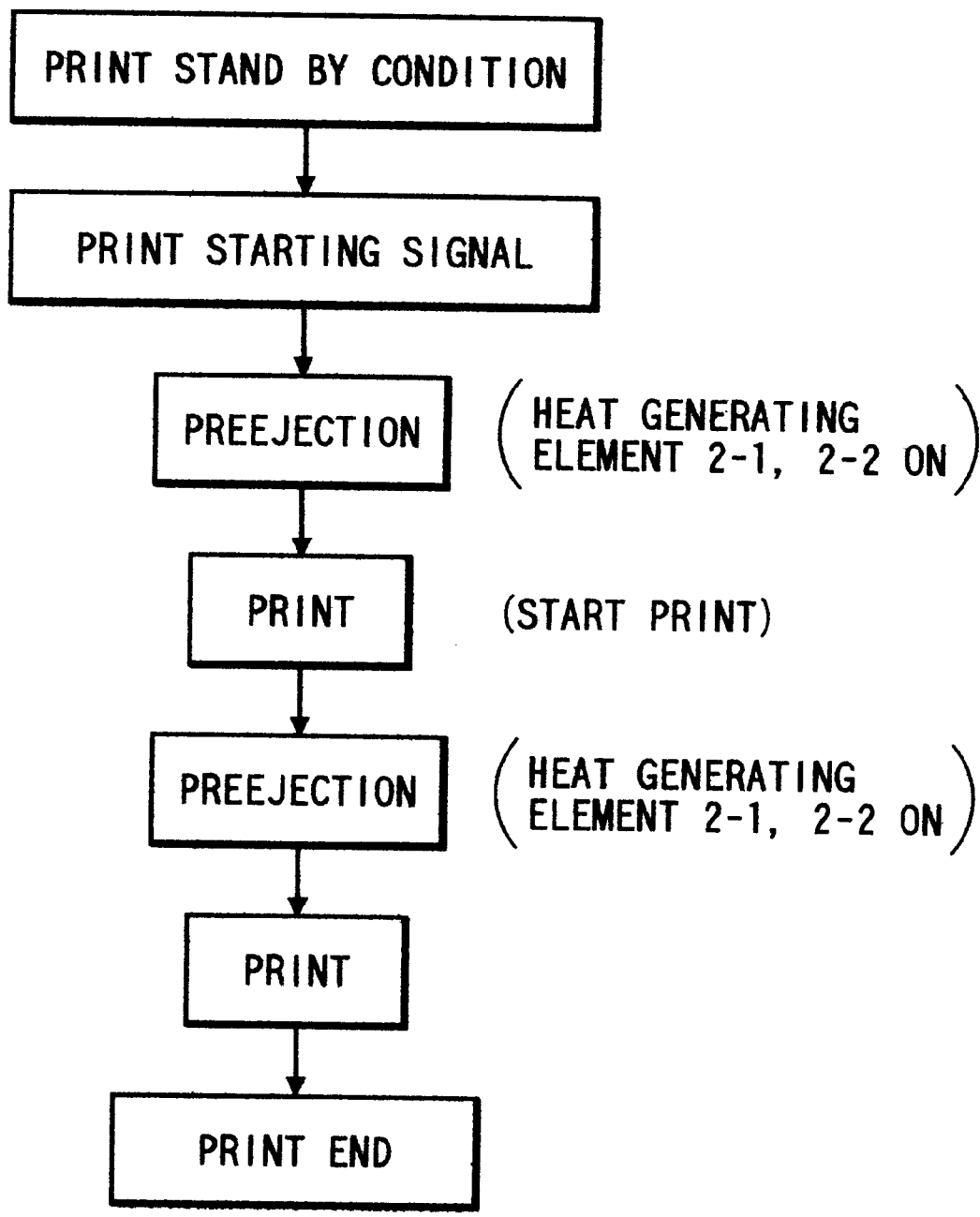
FIG. 20 is a flow chart for explaining a pre-ejection sequence in the present invention.

In addition, since the liquid ejecting head having the structure according to each of the first to sixth embodiments has a plurality of heat generating elements, a pre-ejection operation, which is performed before a print operation to improve the print reliability, can be effectively performed. FIG. 20 is a flow chart showing a sequence from a print start to a print end in the liquid ejecting head of the first embodiment. When a print starting signal is output in a print standby condition, a pre-ejection operation is performed. Thereafter, a print operation is started. In order to prevent nozzles which are not currently used from clogging, a pre-ejection operation is performed even while a print operation is performed. A pre-ejection operation is performed several times to several thousands times at driving frequencies of several 100 Hz to several kHz in accordance with the environment. In the present invention, the heat generating elements 2-1 and 2-2 are simultaneously driven while these pre-ejection operations are performed to realize a highly reliable print operation without any ejection failure and the like even with a smaller number of times of ejection than in the prior art. Therefore, more reliable print quality can be efficiently achieved.

As described above, according to the ejecting method, liquid ejecting head, and the like of the present invention, which have a plurality of heat generating elements and movable members with respect to a liquid flow path, in addition to the structure based on the new ejection principle, gradation images with high stability and high ejection direction precision can be realized, and images with very high quality can be obtained owing to the movable members.

In addition, gradation is realized by ejection amount modulation, and excellent ejection characteristics such as refilling characteristics can be maintained.

Furthermore, with the above effects, images such as curves and oblique lines can be realized with smooth lines, and the quality of images such as characters and graphic patterns can be improved.

Similarly, with the above effects, since the ejection reliability can be improved, pre-ejection immediately before a print operation can be performed with a very small number of times of liquid ejection within a short period of time.

<Other Embodiments>

In the foregoing, the description has been made as to the major parts of the liquid ejecting head and the liquid ejecting method according to the embodiments of the present invention. A description will now be made as to further detailed embodiments usable with the foregoing embodiments. The following examples are usable with both of the single-flow-path type and two-flow-path type unless otherwise specified.

<Positional Relationship between Second Liquid Flow Path and Movable Member>

Figure 21A:
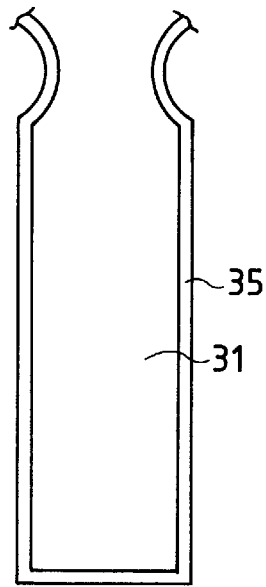
FIGS. 21A to 21C are views for explaining the positional relationship between a movable member and heat generating elements.
Figure 21B:
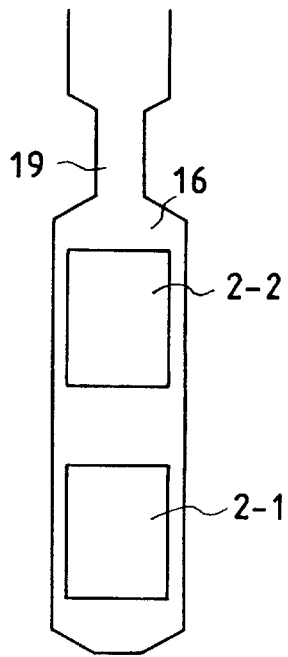
Figure 21C:
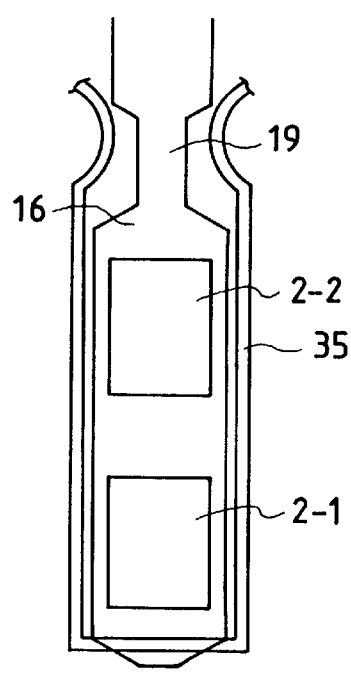

FIGS. 21A to 21C are illustrations of a positional relationship between the above-described movable member 31 and second liquid flow path 16, in which FIG. 21A is a view of the movable member 31 position of the partition wall 30 as seen from the above, and FIG. 21B is a view of the second liquid flow path 16 seen from the above without partition wall 30. FIG. 21C is a schematic view of the positional relationship between the movable member 6 and the second liquid flow path 16 wherein the elements overlap each other. In FIGS. 21A to 21C, the lower side of each drawing indicates a front side where the ejection outlets are formed.

The second liquid flow path 16 of this embodiment has a throat portion 19 on the upstream side of a heat generating element 2-2 (this upstream side is the upstream side in a large flow of the liquid from the second common liquid chamber side to the ejection outlet through the heat generating element position, the movable member position, and the first flow path) so as to provide a chamber (bubble generation chamber) effective to suppress easy release of the pressure produced toward the upstream side upon the bubble generation in the second liquid flow path 16. A similar structure is obtained in FIG. 17 described above, and upstream and downstream throat portions 19 are formed in the embodiment of FIGS. 14 to 20.

In the conventional head wherein the flow path where the bubble generation occurs and the flow path from which the liquid is ejected, are the same, and a throat portion is provided to prevent the release of the pressure generated by the heat generating element toward the liquid chamber, the cross-sectional area of the throat portion should not be too small in consideration of the sufficient refilling of the liquid.

However, in this embodiment, most of the liquid to be ejected can serve as a liquid from the first liquid flow path, and the bubble generation liquid in the second liquid flow path having the heat generating element is not much consumed, so that the filling amount of the bubble generation liquid to the bubble generation region 11 may be small. Therefore, the clearance at the throat portion 19 can be made very small, for example, as small as several $\mu$m to ten-odd $\mu$m, so that the release of the pressure produced in the second liquid flow path can be further suppressed and to further concentrate it on the movable member side. The pressure can be used as the ejection force through the movable member 31, and therefore, a high ejection efficiency and a large ejection force can be accomplished. The shape of the second liquid flow path 16 is not limited to the one described above, but may be any if the pressure produced by the bubble generation is effectively transmitted to the movable member side.

As shown in FIG. 21C, the sides of the movable member 31 cover respective parts of the walls constituting the second liquid flow path so that the falling of the movable member 31 into the second liquid flow path is prevented. By doing so, the above-described separation between the ejection liquid and the bubble generation liquid is further enhanced. Furthermore, the release of the bubble through the slit can be suppressed so that ejection pressure and ejection efficiency are further increased. Moreover, the above-described effect of the refilling from the upstream side by the pressure upon collapse of the bubble can be further enhanced.

In FIGS. 10 and 11, a part of the bubble generated in the bubble generation region of the second liquid flow path 4 with the displacement of the movable member 6 to the first liquid flow path 14 side, extends into the first liquid flow path 14 side. By selecting the height of the second flow path to permit such extension of the bubble, the ejection force is further improved as compared with the case without such extension of the bubble. To extend the bubble into the first liquid flow path 14, the height of the second liquid flow path 16 is preferably lower than the height of the maximum bubble, and preferably several $\mu$m to 30 $\mu$m, for example. In this embodiment, the height is 15 $\mu$m.

<Movable Member and Partition Wall>

Figure 22A:
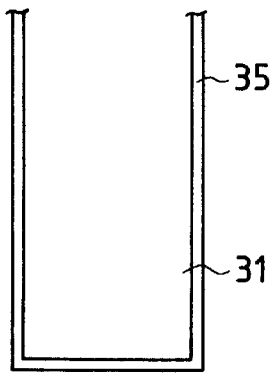
FIGS. 22A to 22C are view for explaining the shapes of movable members.
Figure 22B:
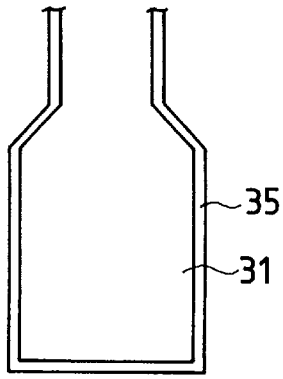
Figure 22C:
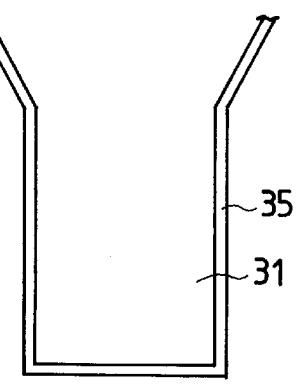

FIGS. 22A to 22C show other examples of the movable member 31, wherein reference numeral 35 designates a slit formed in the partition wall, and the slit is effective to provide the movable member 31. In FIG. 22A, the movable member has a rectangular shape, and in FIG. 22B, it is narrower in the fulcrum side to facilitate the operation of the movable member, and in FIG. 22C, it has a wider fulcrum side to enhance the durability of the movable member. The shape narrowed and arcuated at the fulcrum side is desirable as shown in FIG. 22A, since both of operational facilitation and durability are satisfied. However, the configuration of the movable member is not limited to the one described above, but it may have any shape if it does not enter the second liquid flow path side, and operational facilitation with high durability is achieved.

In the foregoing embodiments, the plate or film movable member 31 and the separation wall 5 having this movable member was made of nickel having a thickness of 5 $\mu$m, but is not limited to this example, but it may be any if it has anti-solvent properties against the bubble generation liquid and the ejection liquid, and if the elasticity is enough to permit the operation of the movable member, and if the required fine slit can be formed.

Preferable examples of the materials for the movable member include highly durable materials such as a metal such as silver, nickel, gold, iron, titanium, aluminum, platinum, tantalum, stainless steel, or phosphor bronze, an alloy thereof, a resin material having a nitrile group such as acrylonitrile, butadiene, or styrene, a resin material having an amide group such as polyamide, a resin material having a carboxyl group such as polycarbonate, a resin material having an aldehyde group such as polyacetal, a resin material having a sulfone group such as polysulfone, a resin material such as a liquid crystal polymer, and a compound thereof; and materials having a high resistance to ink, such as a metal such as gold, tungsten, tantalum, nickel, stainless steel, or titanium, an alloy thereof, a material coated with such a metal, a resin material having an amide group such as polyamide, a resin material having an aldehyde group such as polyacetal, a resin material having a ketone group such as polyether ether ketone, a resin material having an imide group such as polyimide, a resin material having a hydroxyl group such as phenolic resin, a resin material having an ethyl group such as polyethylene, a resin material having an alkyl group such as polypropylene, a resin material having an epoxy group such as epoxy resin, a resin material having an amino group such as melamine resin, a resin material having a methylol group such as xylene resin, a compound thereof, a ceramic material such as silicon dioxide, and a compound thereof.

Preferable examples of the partition or division wall include resin materials having a high heat and solvent resistance and high molding properties, and more particularly recent engineering plastic resin materials such as polyethylene, polypropylene, polyamide, polyethylene terephthalate, melamine resin, phenolic resin, epoxy resin, polybutadiene, polyurethane, polyether ether ketone, polyether sulfone, polyarylate, polyimide, polysulfone, a liquid crystal polymer (LCP), a compound thereof, a metal such as silicon dioxide, silicon nitride, nickel, gold, stainless steel, an alloy thereof, a compound thereof, and a material coated with titanium or gold.

The thickness of the separation wall is determined depending on the material used and shape from the viewpoint of sufficient strength as the wall and sufficient operability as the movable member, and generally, about 0.5 $\mu$m to 10 $\mu$m is desirable.

The width of the slit 35 for providing the movable member 31 is 2 $\mu$m in the embodiments. When the bubble generation liquid and ejection liquid are different materials, and mixing of the liquids is to be avoided, the gap is so determined as to form a meniscus between the liquids, thus avoiding mixing therebetween. For example, when the bubble generation liquid has a viscosity of about 2 cps, and the ejection liquid has a viscosity of 100 cps or more, a slit of about 5 $\mu$m is enough to avoid the liquid mixing, but 3 $\mu$m or less is desirable.

If a slit on the order of several $\mu$m is used as the slit for providing a substantially sealed state in the present invention, a more reliable structure can be obtained.

<Element Substrate>

A description will be made for the structure of an element substrate provided with a heat generating element for heating a liquid.

Figure 23A:
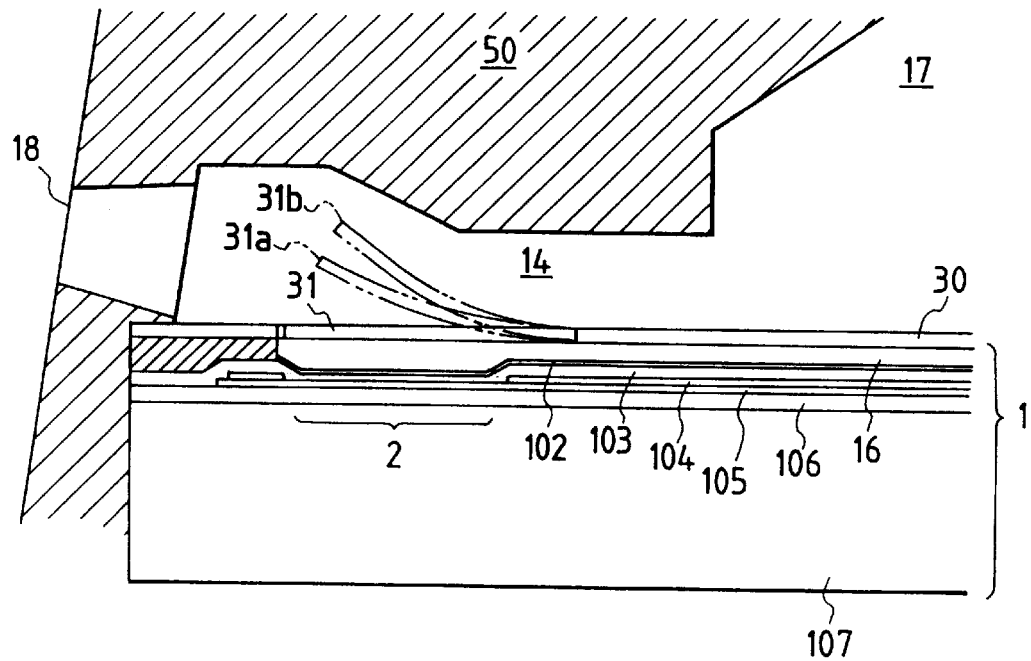
FIGS. 23A and 23B are longitudinal sectional views of the liquid ejecting head of the present invention.
Figure 23B:
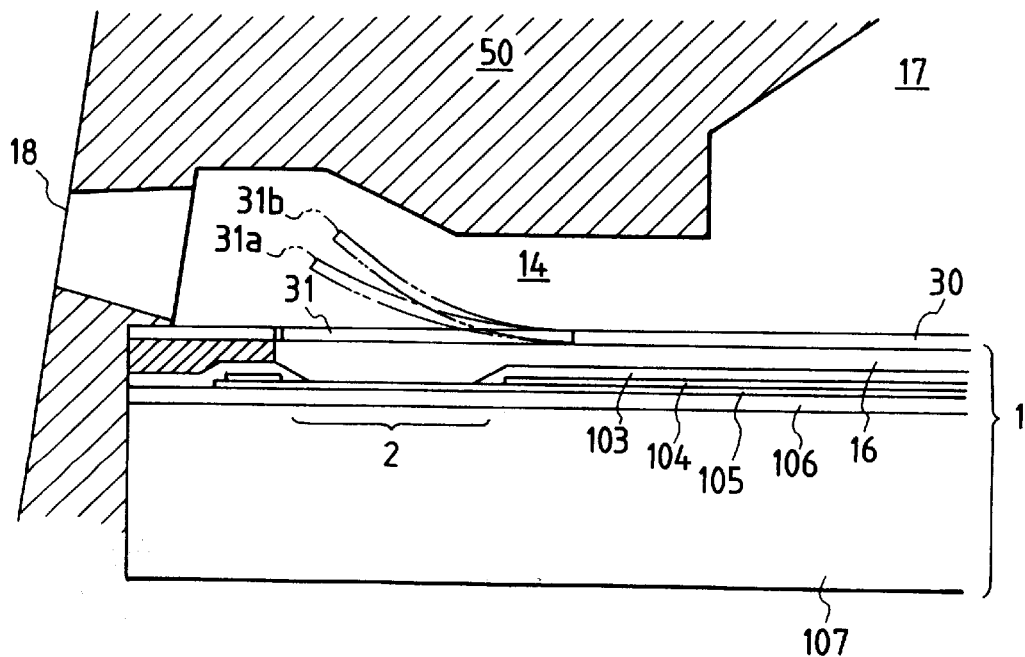

FIGS. 23A and 23B are longitudinal sectional views of a liquid ejecting head according to the present invention, in which FIG. 23A shows a head with a protection layer (to be described later), and FIG. 23B shows a head without a protection layer.

FIGS. 23A and 23B show the longitudinal section of the embodiment shown in FIGS. 8A and 8B and the like, and only one of a plurality of heat generating elements is illustrated on the longitudinal section.

On the element substrate 1, a grooved member 50 is mounted, the member 50 having second liquid flow paths 16, separation walls 30, first liquid flow paths 14, and grooves for constituting the first liquid flow path.

The element substrate 1 has a patterned wiring electrode (0.2 to 0.1 $\mu$m thick) of aluminum or the like and a patterned electric resistance layer 105 (0.01 to 0.2 $\mu$m thick) of hafnium boride ($HfB_2$), tantalum nitride (TaN), tantalum aluminum (TaAl) or the like constituting the heat generating element on a silicon oxide film or silicon nitride film 106 for insulation and heat accumulation, which in turn is on the substrate 107 of silicon or the like. A voltage is applied to the resistance layer 105 through the two wiring electrodes 104 to flow a current through the resistance layer to effect heat generation. Between the wiring electrodes, a protection layer of silicon oxide, silicon nitride or the like of 0.1 to 2.0 $\mu$m thick is provided on the resistance layer, and in addition, an anti-cavitation layer of tantalum or the like (0.1 to 0.6 $\mu$m thick) is formed thereon to protect the resistance layer 105 from various liquids such as an ink.

The pressure and shock wave generated upon the bubble generation and collapse is so strong that the durability of the oxide film which is relatively fragile is deteriorated. Therefore, a metal material such as tantalum (Ta) is used as the anti-cavitation layer.

The protection layer may be omitted depending on the combination of liquid, liquid flow path structure and resistance material. One of such examples is shown in FIG. 23B. The material of the resistance layer not requiring the protection layer, includes, for example, iridium-tantalum-aluminum alloy or the like. Thus, the structure of the heat generating element in the foregoing embodiments may include only the resistance layer (heat generation portion) or may include a protection layer for protecting the resistance layer.

In the embodiment, the heat generating element has a heat generation portion having the resistance layer which generates heat in response to the electric signal. The element is not limited to this, and it will suffice if a bubble enough to eject the ejection liquid is created in the bubble generation liquid. For example, the heat generation portion may be in the form of a photothermal transducer which generates heat upon receiving light such as a laser beam, or the one which generates heat upon receiving high-frequency wave.

On the element substrate 1, functional elements such as a transistor, a diode, a latch, and a shift register for selectively driving the element may also be integrally built in, in addition to the resistance layer 105 constituting the heat generating element and the constituted by the wiring electrode 104 for supplying the electric signal to the resistance layer.

Figure 24:
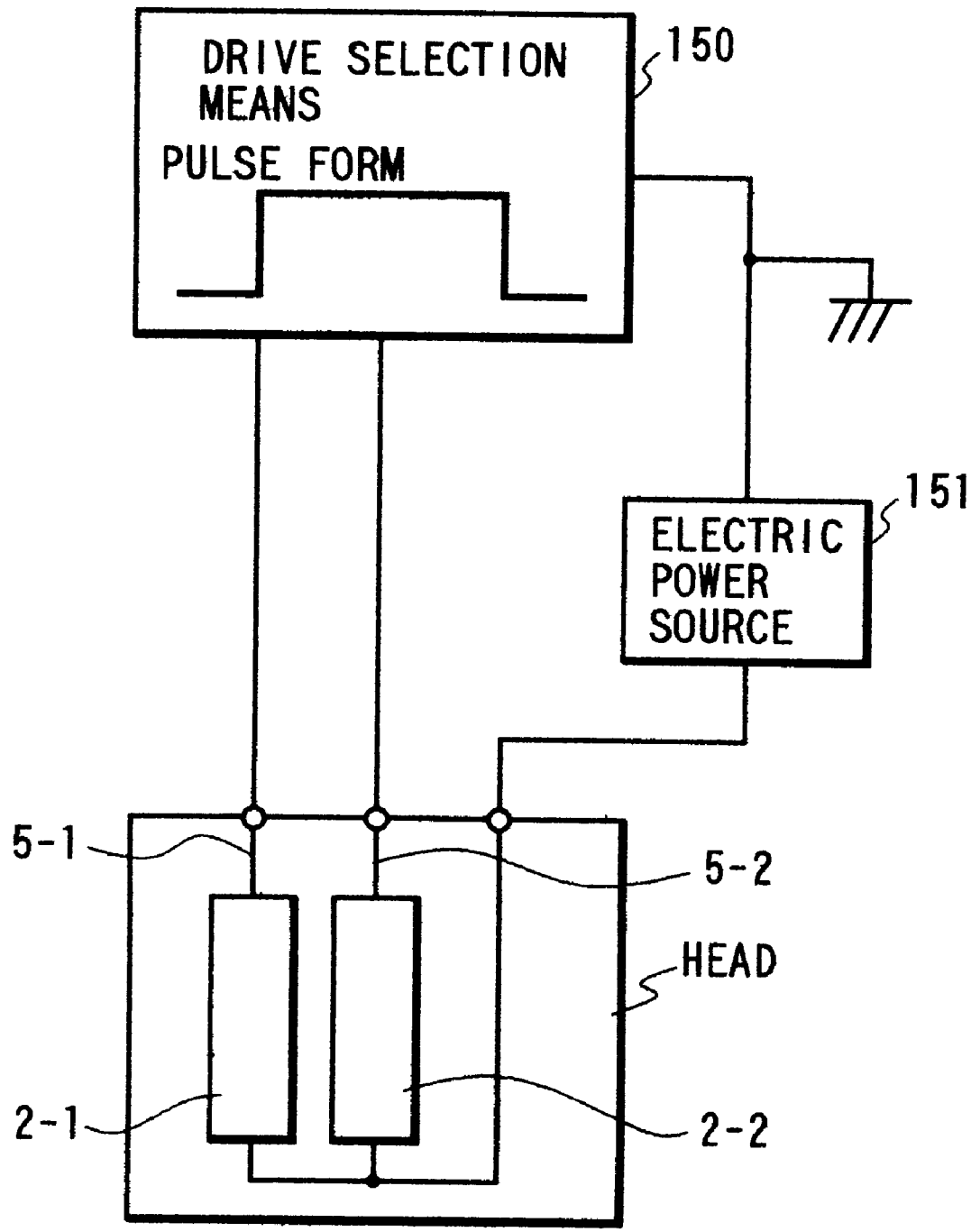
FIG. 24 is a schematic view showing the waveform of a driving pulse.

In order to eject the liquid by driving the heat generation portion of the on the above-described element substrate 1, the resistance layer 105 is supplied through the wiring electrode 104 with rectangular pulses as shown in FIG. 24 from a drive selection means 150 to cause instantaneous heat generation in the resistance layer 105 between the wiring electrodes. In the heads of the foregoing embodiments, the applied energy has a voltage of 24 V, a pulse width of 7 $\mu$sec, a current of 150 mA and a frequency of 6 kHz to drive the heat generating element, by which the liquid ink is ejected through the ejection outlet through the process described hereinbefore.

Referring to FIGS. 23A and 23B, "31a" and "31b" indicate how the movable member is displaced upon generation of a bubble by the above bubble generation unit.

The movable member 31 can be displaced by different amounts by selectively driving the heat generating elements 2-1 and 2-2, as indicated by "31a" and "31b". With this operation, the ejection state such as the ejection amount can be changed. In addition, the ejection state can be changed to a certain degree by changing the above drive conditions, i.e., the voltage and the pulse width.

<Head Structure of Two Flow Paths>

A description will be made for a structure of the liquid ejecting head with which different liquids are separately accommodated in first and second common liquid chambers, and the number of parts can be reduced so that the manufacturing cost can be reduced.

Figure 25:
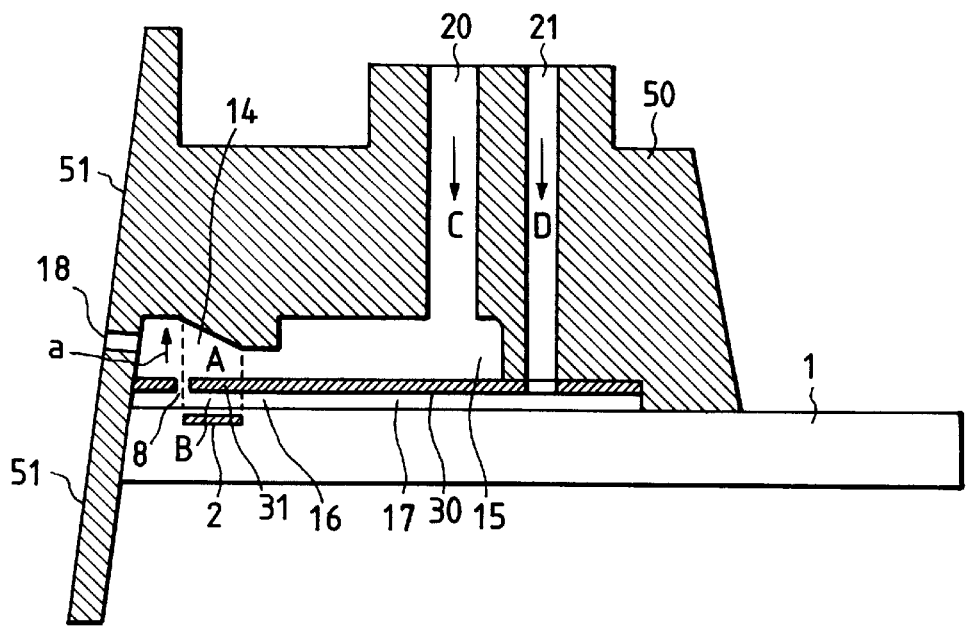
FIG. 25 is a view for explaining a supply path in the liquid ejecting head of the present invention.

FIG. 25 is a schematic view of such a liquid ejecting head. The same reference numerals as in the previous embodiment are assigned to the elements having the corresponding functions, and a detailed description thereof is omitted for simplicity.

In this embodiment, a grooved member 50 has an orifice plate 51 having an ejection outlet 18, a plurality of grooves for constituting a plurality of first liquid flow paths 14 and a recess for constituting the first common liquid chamber 15 for supplying the liquid (ejection liquid) to the plurality of liquid flow paths 14.

A separation wall 30 is mounted to the bottom of the grooved member 50 by which plurality of first liquid flow paths 14 are formed. Such a grooved member 50 has a first liquid supply path 20 extending from an upper position to the first common liquid chamber 15. The grooved member 50 also has a second liquid supply path 21 extending from au upper position to the second common liquid chamber 17 through the separation wall 30.

As indicated by an arrow C in FIG. 25, the first liquid (ejection liquid) is supplied through the first liquid supply path 20 and first common liquid chamber 15 to the first liquid flow path 14, and the second liquid (bubble generation liquid) is supplied to the second liquid flow path 16 through the second liquid supply path 21 and the second common liquid chamber 17 as indicated by arrow D in FIG. 25.

In this example, the second liquid supply path 21 is extended in parallel with the first liquid supply path 20, but is not limited to this, but it may be any if the liquid is supplied to the second common liquid chamber 17 through the separation wall 30 outside the first common liquid chamber 15.

The (diameter) of the second liquid supply path 21 is determined in consideration of the supply amount of the second liquid. The shape of the second liquid supply path 21 is not limited to be circular or round but may be rectangular or the like.

Figure 26:
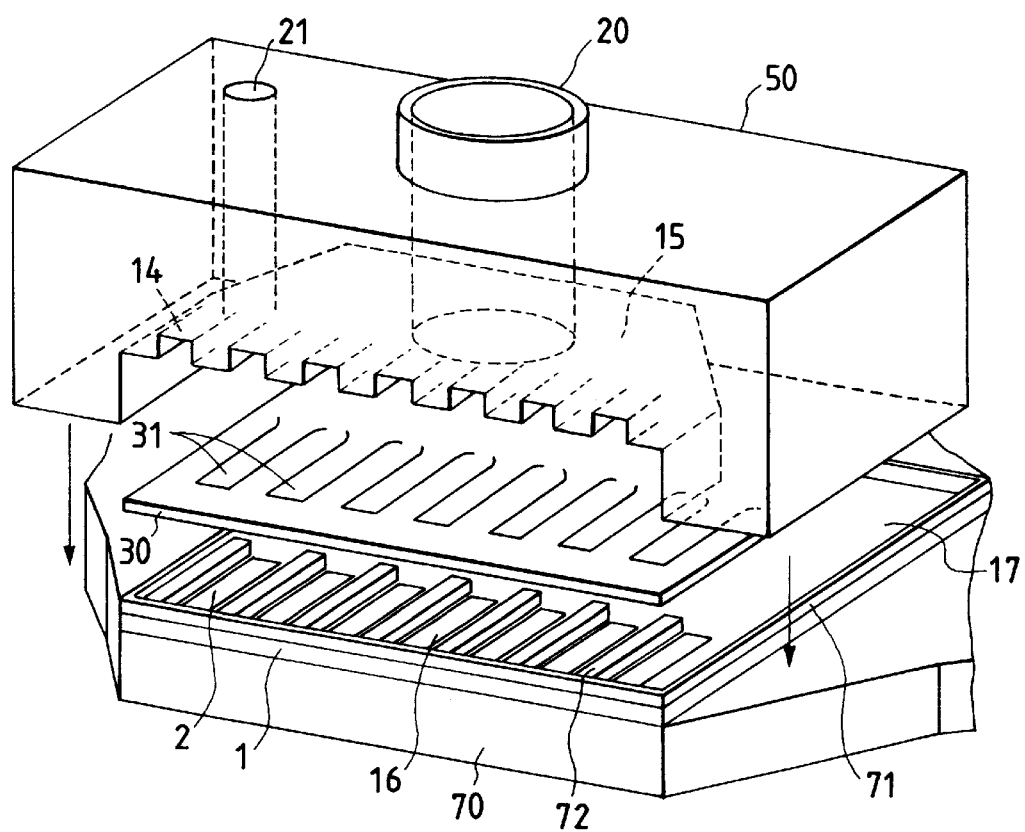
FIG. 26 is an exploded perspective view of the liquid ejecting head of the present invention.

The second common liquid chamber 17 may be formed by dividing the grooved by a separation wall 30. As for the method of forming this, as shown in FIG. 26 which is an exploded perspective view, a common liquid chamber frame and a second liquid path wall may be formed of a dry film, and a combination of a grooved member 50 having the separation wall fixed thereto and the element substrate 1 may be bonded, thus forming the second common liquid chamber 17 and the second liquid flow path 16.

In this example, the element substrate 1 is constituted by providing the supporting member 70 of a metal such as aluminum with a plurality of elements as heat generating elements for generating heat for bubble generation from the bubble generation liquid through film boiling.

Above the element substrate 1, there are disposed the plurality of grooves constituting the liquid flow path 16 formed by the second liquid path walls, the recess for constituting the second common liquid chamber (common bubble generation liquid chamber) 17 which is in fluid communication with the plurality of bubble generation liquid flow paths for supplying the bubble generation liquid to the bubble generation liquid paths, and the separation or dividing walls 30 having the movable walls 31.

Designated by reference numeral 50 is a grooved member. The grooved member is provided with grooves for constituting the ejection liquid flow paths (first liquid flow paths) 14 by bonding the separation walls 30 thereto, a recess for constituting the first common liquid chamber (common ejection liquid chamber) 15 for supplying the ejection liquid to the ejection liquid flow paths, the first supply path (ejection liquid supply path) 20 for supplying the ejection liquid to the first common liquid chamber, and the second supply path (bubble generation liquid supply path) 21 for supplying the bubble generation liquid to the second supply path (bubble generation liquid supply path) 21. The second supply path 21 is connected with a fluid communication path in fluid communication with the second common liquid chamber 17, penetrating through the separation wall 30 disposed outside the first common liquid chamber 15. By the provision of the fluid communication path, the bubble generation liquid can be supplied to the second common liquid chamber 15 without mixing with the ejection liquid.

The positional relationship among the element substrate 1, separation wall 30, grooved top plate 50 is such that the movable members 31 are arranged corresponding to the heat generating elements on the element substrate 1, and that the ejection liquid flow paths 14 are arranged corresponding to the movable members 31. In this embodiment, one second supply path is provided for the grooved member, but it may be plural in accordance with the supply amount. The cross-sectional area of the flow path of the ejection liquid supply path 20 and the bubble generation liquid supply path 21 may be determined in proportion to the supply amount.

By the optimization of the cross-sectional area of the flow path, the parts constituting the grooved member 50 or the like can be downsized.

As described in the foregoing, according to this embodiment, the second supply path for supplying the second liquid to the second liquid flow path and the first supply path for supplying the first liquid to the first liquid flow path, can be provided by a single grooved top plate, so that the number of parts can be reduced, and therefore, the reduction of the manufacturing steps and therefore the reduction of the manufacturing cost, are accomplished.

Furthermore, the supply of the second liquid to the second common liquid chamber in fluid communication with the second liquid flow path, is effected through the second liquid flow path which penetrates the separation wall for separating the first liquid and the second liquid, and therefore, one bonding step is enough for the bonding of the separation wall, the grooved member and the heat generating element substrate, so that the manufacturing is facilitated, and the accuracy of the bonding is improved.

Since the second liquid is supplied to the second liquid common liquid chamber, extending through the separation wall, the supply of the second liquid to the second liquid flow path is assured, and therefore, the supply amount is sufficient so that the stable ejection is accomplished.

<Ejection Liquid and Bubble Generation Liquid>

As described in the foregoing embodiment, according to the present invention, by the structure having the movable member described above, the liquid can be ejected at higher ejection force or ejection efficiency than the conventional liquid ejecting head. When the same liquid is used for the bubble generation liquid and the ejection liquid in each of the embodiments described above, it is possible that the liquid is not deteriorated, and that deposition on the heat generating element due to heating can be reduced. Therefore, a reversible state change is accomplished by repeating evaporation and condensation. So, various liquids are usable, if the liquid is the one not deteriorating the liquid flow path, movable member or separation wall or the like.

Among such liquids, an ink having the ingredient as used in conventional bubble jet device, can be used as a recording liquid.

When the two-flow-path structure of the present invention is used, different liquids can be used for the ejection and bubble generation liquids. It is possible to eject a liquid which is difficult to eject, by using bubbles of the bubble generation liquid. In this manner, when different ejection liquid and bubble generation liquid are used, the bubble generation liquid having the above-described properties is used, and more particularly, the examples includes: methanol, ethanol, n-propanol, isopropanol, n-hexane, n-heptane, n-octane, toluene, xylene, methylene dichloride, Trichloroethylene, FreonTF, FreonBF, ethyl ether, dioxane, cyclohexane, methyl acetate, ethyl acetate, acetone, methyl ethyl ketone, water, and a mixture thereof.

As for the ejection liquid, various liquids are usable without paying attention to the degree of bubble generation property or thermal property. The liquids which have not been conventionally usable, because of poor bubble generation property and/or easiness of property change due to heat, are usable.

However, it is desired that the ejection liquid by itself or by reaction with the bubble generation liquid, does not impede the ejection, the bubble generation or the operation of the movable member or the like.

As for the recording ejection liquid, a highly viscous ink or the like is usable. As for another ejection liquid, phamaceuticals and perfume or the like having a nature easily deteriorated by heat is usable.

The ink of the following ingredient was used as the recording liquid usable for both the ejection liquid and the bubble generation liquid, and the recording operation was carried out. Since the ejection rate of the ink is increased, the shot accuracy of the liquid droplets is improved, and therefore, highly desirable images were recorded.

| Dye ink viscosity of 2 cps | |
|---|---|
| (C. I. hood black 2) dye | 3 wt % |
| diethylene glycol | 10 wt % |
| Thiodiglycol | 5 wt % |
| Ethanol | 3 wt % |
| Water | 77 wt % |

Recording operations were also carried out using the following combination of the liquids for the bubble generation liquid and the ejection liquid. As a result, the liquid having a viscosity of ten-odd cps, which was unable to be ejected heretofore, was properly ejected, and even a 150-cps liquid was properly ejected to provide a high-quality image.

| Bubble generation liquid 1 | |
|---|---|
| Ethanol | 40 wt % |
| Water | 60 wt % |
| Bubble generation liquid 2 | |
| Water | 100 wt % |

| -continued | |
|---|---|
| Bubble generation liquid 3 | |
| Isopropyl alcohol | 10 wt % |
| Water | 90 wt % |
| Ejection liquid 1 | |
| (pigment ink approx. 15 cps) | |
| Carbon black | 5 wt % |
| Styrene - acrylic acid - acrylate ethyl copolymer (oxidation 140, average molecular weight 8000) | 1 wt % |
| Monoethanolamine | 0.25 wt % |
| Glycerin | 69 wt % |
| Thiodiglycol | 5 wt % |
| Ethanol | 3 wt % |
| Water | 16.75 wt % |
| Ejection liquid 2 (55 cps) | |
| Polyethylene glycol 200 | 100 wt % |
| Ejection liquid 3 (150 cps) | |
| Polyethylene glycol 600 | 100 wt % |

In the case of the liquid which has not been easily ejected, the ejection rate is low, and therefore, the ejection direction varies with the result of poor dot landing accuracy on the recording paper. Additionally, an ejection amount varies due to the ejection instability, thus disabling recording of a high-quality image. However, according to the embodiments, the use of the bubble generation liquid permits sufficient and stabilized generation of the bubble. Thus, the improvement in the landing accuracy of the liquid droplet and the stability of the ink ejection amount can be accomplished, thus improving the recording image quality remarkably. According to the present invention, good gradation recording can be achieved even in use of the above-described liquid which is difficult to conventionally eject.

<Liquid Ejection Head Cartridge>

A description will be made for a liquid ejection head cartridge having a liquid ejecting head according to an embodiment of the present invention.

Figure 27:
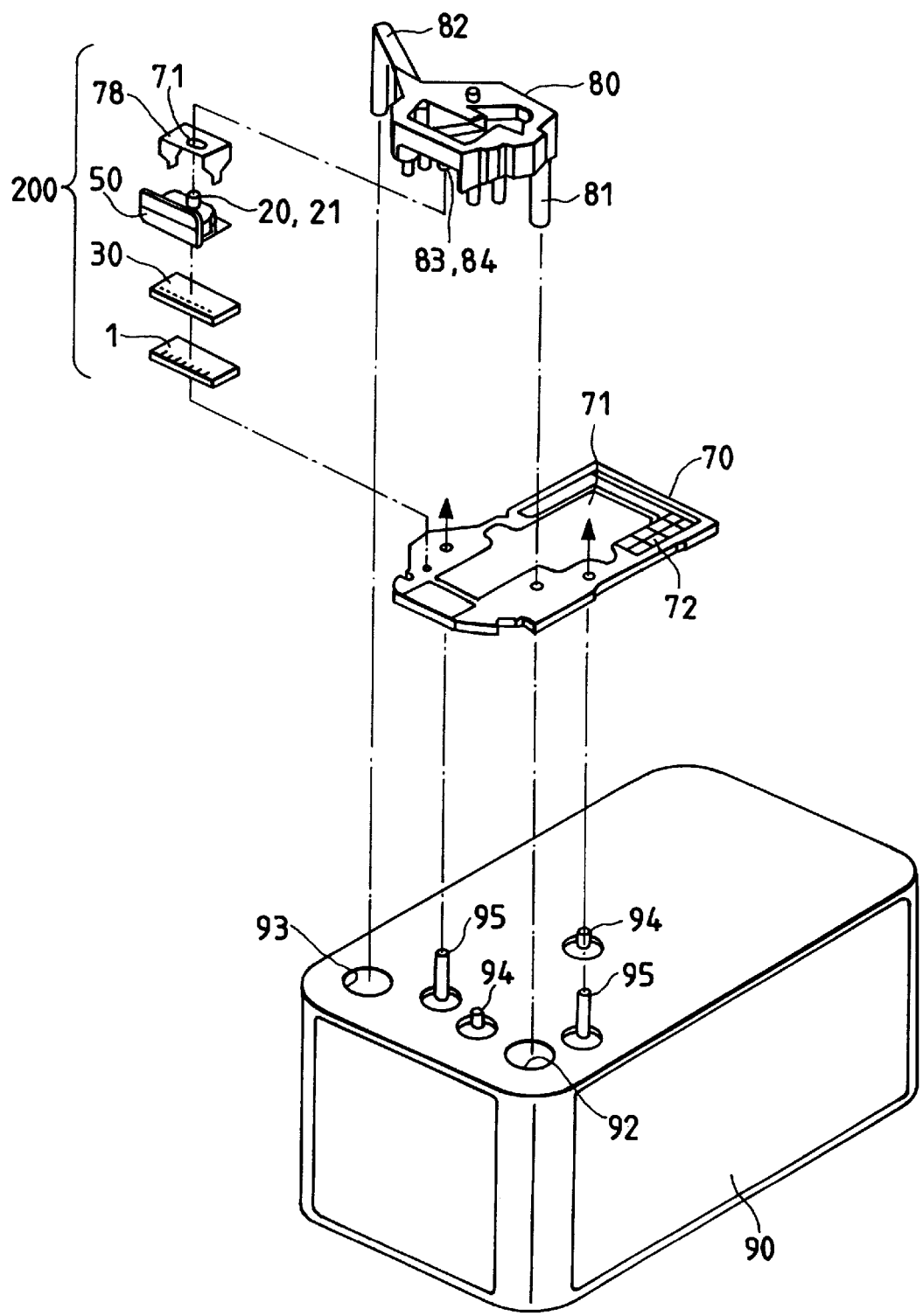
FIG. 27 is an exploded perspective view of a liquid ejecting head cartridge.

FIG. 27 is a schematic exploded perspective view of a liquid ejection head cartridge including the above-described liquid ejecting head, and the liquid ejection head cartridge comprises generally a liquid ejecting head portion 200 and a liquid container 80.

The liquid ejecting head portion 200 comprises an element substrate 1, a separation wall 30, a grooved member 50, a counter spring 70, a liquid supply member 90, and a supporting member 70. The element substrate 1 is provided with a plurality of heat generating resistors for supplying heat to the bubble generation liquid, as described hereinbefore. A bubble generation liquid path is formed between the element substrate 1 and the separation wall 30 having the movable wall. By joining the separation wall 30 and the grooved top plate 50, an ejection flow path (not shown) for fluid communication with the ejection liquid is formed.

The counter spring 70 functions to urge the grooved member 50 to the element substrate 1, and is effective to properly integrate the element substrate 1, separation wall 30, the grooved member 70, and a supporting member 70 which will be described hereinafter.

The supporting member 70 functions to support the element substrate 1 or the like, and the supporting member 70 has thereon a circuit board 71 connected to the element substrate 1 to supply the electric signal thereto, and contact pads 72 for electric signal transfer to the device side when the cartridge is mounted on the apparatus.

The liquid container 90 contains the ejection liquid such as an ink to be supplied to the liquid ejecting head and the bubble generation liquid for bubble generation, separately. A positioning portion 94 for mounting a connecting member for connecting the liquid ejecting head with the liquid container and a fixing shaft 95 for fixing the connection portion are disposed outside the liquid container 90. The ejection liquid is supplied to the ejection liquid supply path 81 of a liquid supply member 80 through a supply path 81 of the connecting member from the ejection liquid supply path 92 of the liquid container, and is supplied to a first common liquid chamber through the ejection liquid supply paths 83 and 21 of the members via the circuit board 71. The bubble generation liquid is similarly supplied to the bubble generation liquid supply path 82 of the liquid supply member 80 through the supply path of the connecting member from the supply path 93 of the liquid container, and is supplied to the second liquid chamber through the bubble generation liquid supply paths 84 and 22 of the members via the circuit board 71.

In such a liquid ejection head cartridge, even if the bubble generation liquid and the ejection liquid are different liquids, the liquids are supplied in good order. In the case that the ejection liquid and the bubble generation liquid are the same, the supply paths for the bubble generation liquid and the ejection liquid need not be separated.

After the liquid is used up, the liquid containers may be supplied with the respective liquids. To facilitate this supply, the liquid container is desirably provided with a liquid injection port. The liquid ejecting head and liquid container may be integral, or may be separable.

<Liquid Ejecting Device>

Figure 28:
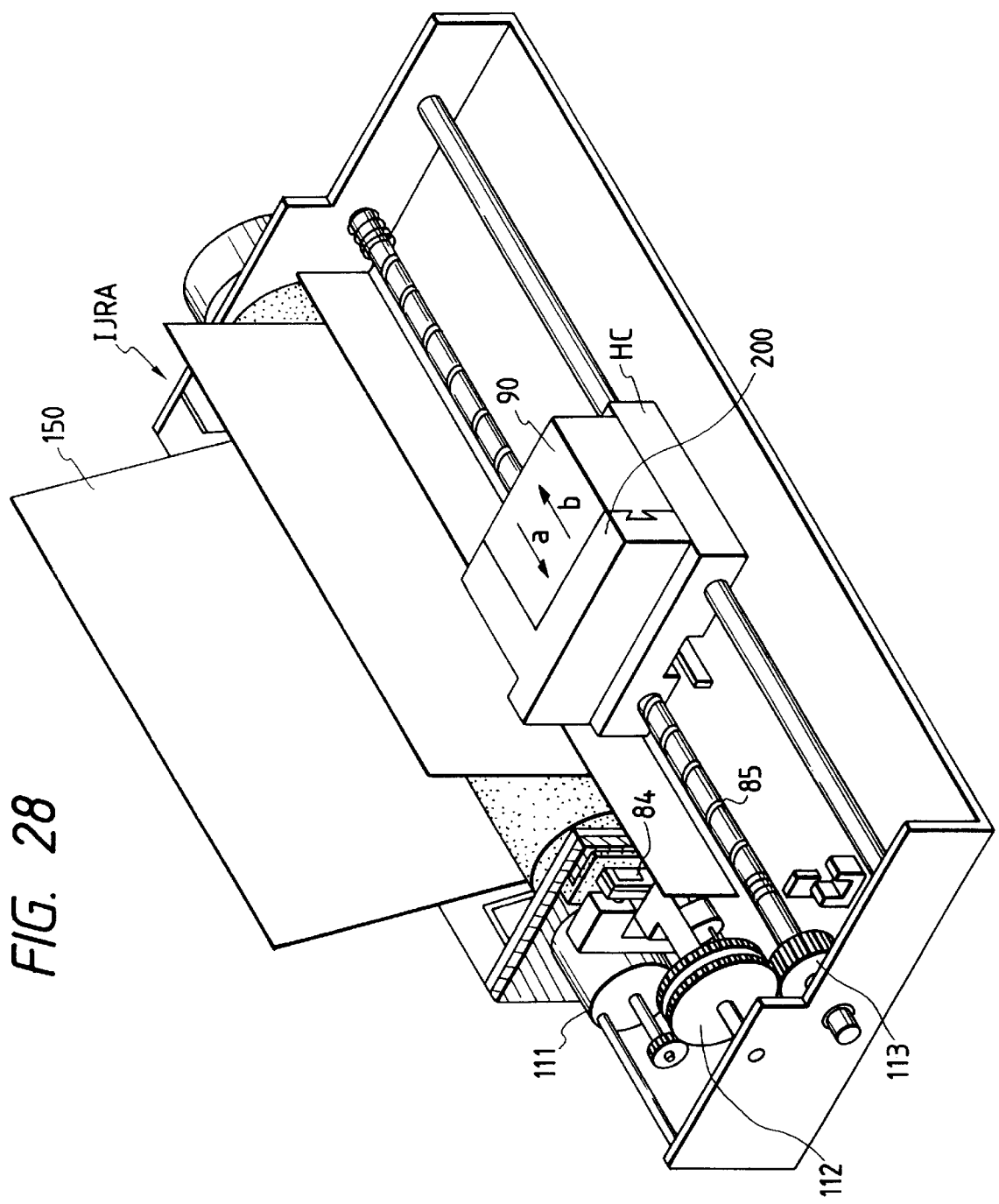
FIG. 28 is a perspective view showing the structure of a liquid ejecting device.

FIG. 28 is a schematic illustration of a liquid ejecting device used with the above-described liquid ejecting head. In this embodiment, the ejection liquid is an ink, and the apparatus is an ink ejection recording apparatus. The liquid ejecting device comprises a carriage HC to which the head cartridge comprising a liquid container portion 90 and liquid ejecting head portion 200 which are detachably connectable with each other, is mountable. The carriage HC is reciprocable in the widthwise direction of the recording material 150 such as a recording sheet or the like fed by a recording material transporting means.

When a driving signal is supplied to the liquid ejecting means on the carriage from a driving signal supply means (not shown), the recording liquid is ejected to the recording material from the liquid ejecting head in response to the signal.

The liquid ejecting apparatus of this embodiment includes a motor 111 as a driving source for driving the recording material transporting means and the carriage, gears 112 and 113 for transmitting the power from the driving source to the carriage, and a carriage shaft 115. By the recording device and the liquid ejecting method using this recording device, good prints can be provided by ejecting the liquid to the various recording materials.

Figure 29:
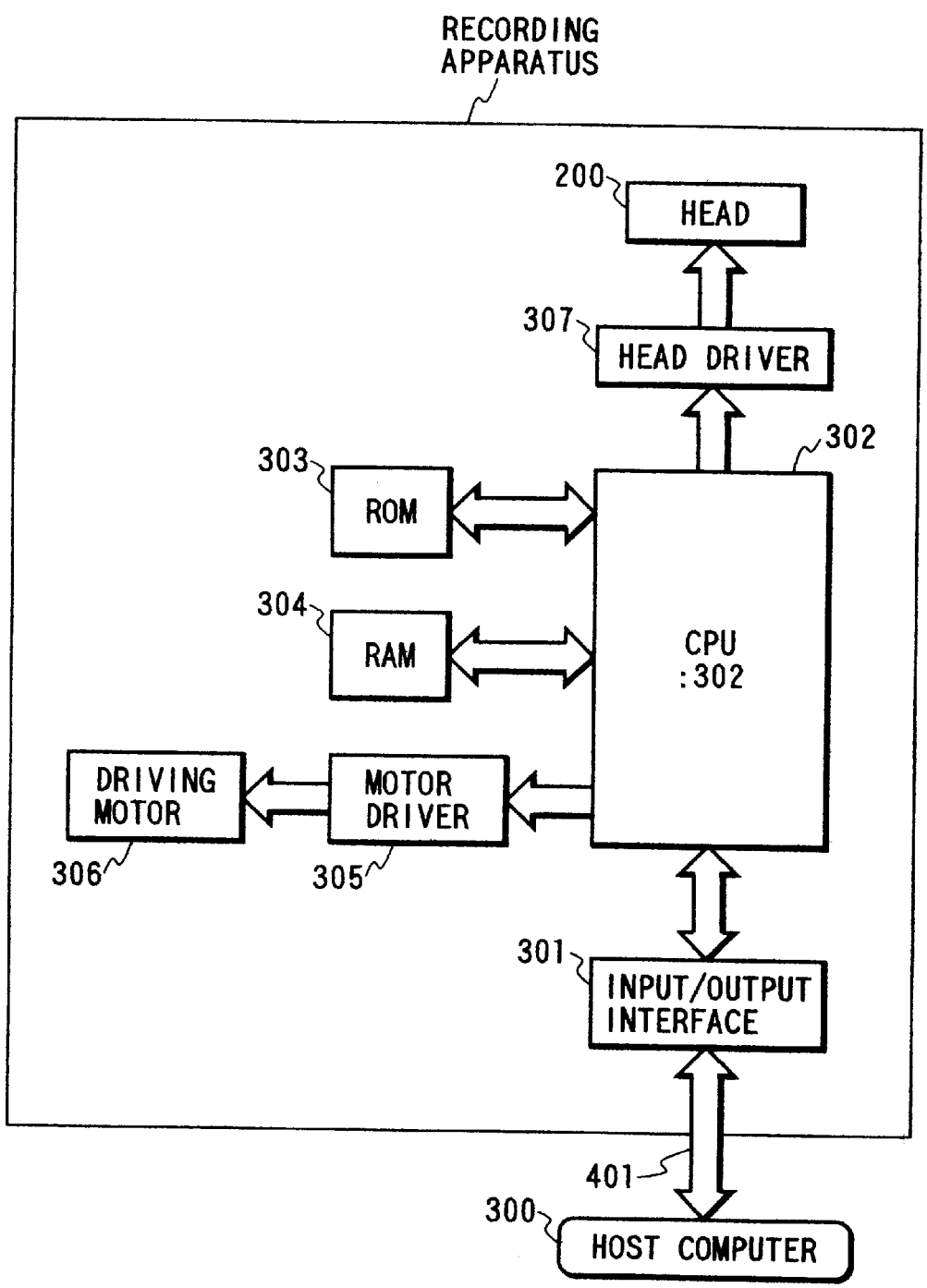
FIG. 29 is a block diagram of the device.

FIG. 29 is a block diagram describing the general operation of an ink ejection recording apparatus which employs the liquid ejection method, and the liquid ejection head, in accordance with the present invention.

The recording apparatus receives printing data in the form of a control signal from a host computer 300. The printing data is temporarily stored in an input interface 301 of the printing apparatus, and at the same time, is converted into processable data to be inputted to a CPU 302, which also serves as a means for supplying a head driving signal. The CPU 302 processes the aforementioned data inputted to the CPU 302, into printable data (image data), by processing them with the use of peripheral units such as RAMs 304 or the like, following control programs stored in a ROM 303.

Further, in order to record the image data onto an appropriate spot on a recording sheet, the CPU 302 generates driving data for driving a driving motor which moves the recording sheet and the recording head in synchronism with the image data. The image data and the motor driving data are transmitted to a head 200 and a driving motor 306 through a head driver 307 and a motor driver 305, respectively, which are controlled with the proper timings for forming an image. Note that a signal representing a specific combination with which a plurality of heat generating elements are used is also supplied from the CPU 302 to the head 200 through the head driver 307 in order to achieve gradation recording.

As for a recording medium, to which a liquid such as an ink is applied, and which is usable with a recording apparatus such as the one described above, the following can be listed; various sheets of paper; OHP sheets; a plastic material used for forming compact disks, ornamental plates, or the like; fabric; a metallic material such as aluminum or copper; a leather material such as cow hide, pig hide, or a synthetic leather; a lumber material such as solid wood, or plywood; a bamboo material; a ceramic material such as a tile; and a material such as sponge which has a three-dimensional structure.

The aforementioned recording apparatus includes a printing apparatus for various sheets of paper or OHP sheet, a recording apparatus for a plastic material such as plastic material used for forming a compact disk or the like, a recording apparatus for a metallic plate or the like, a recording apparatus for a leather material, a recording apparatus for a lumber material, a recording apparatus for a ceramic material, a recording apparatus for a three-dimensional recording medium such as sponge, a textile printing apparatus for recording images on fabric, and the like.

As for the liquid to be used with these liquid ejection apparatuses, any liquid is usable as long as it is compatible with the employed recording medium, and the recording conditions.

<Recording System>

Next, an exemplary ink jet recording system will be described, which records images on a recording medium, using, as the recording head, the liquid ejection head in accordance with the present invention.

Figure 30:
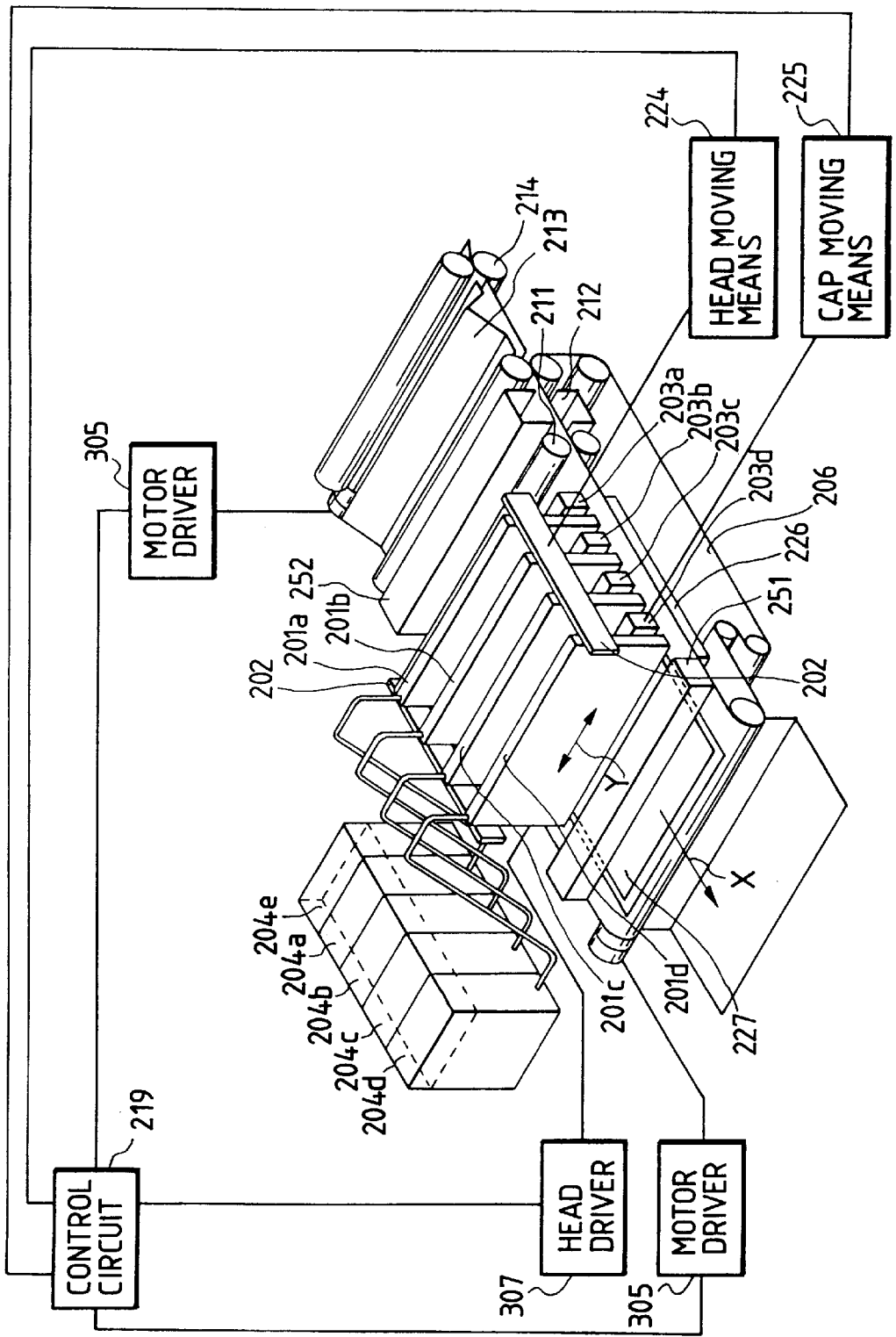
FIG. 30 is a view showing a liquid ejection recording system.

FIG. 30 is a schematic perspective view of an ink jet recording system employing the aforementioned liquid ejection head 201 in accordance with the present invention, and depicts its general structure. The liquid ejection head in this embodiment is a full-line type head, which comprises plural ejection orifices aligned with a density of 360 dpi so as to cover the entire recordable range of the recording medium 150. It comprises four heads, which are correspondent to four colors; yellow (Y), magenta (M), cyan (C) and black (Bk). These four heads are fixedly supported by a holder 202, in parallel to each other and with predetermined intervals.

These heads are driven in response to the signals supplied from the head driver 307, which constitutes a means for supplying a driving signal to each head.

Each of the four color inks (Y, M, C and Bk) is supplied to a correspondent head from an ink container 204a, 204b, 205c or 204d. A reference numeral 204e designates a bubble generation liquid container from which the bubble generation liquid is delivered to each head.

Below each head, a head cap 203a, 203b, 203c or 203d is disposed, which contains an ink absorbing member composed of sponge or the like. The caps cover the ejection orifices of the corresponding heads, protecting the heads, and also allow maintenance of the heads during a non-recording period.

A reference numeral 206 designates a conveyor belt, which constitutes a means for conveying the various recording media such as those described in the preceding embodiments. The conveyor belt 206 is routed through a predetermined path by various rollers, and is driven by a driver roller connected to the motor driver 305.

The ink jet recording system in this embodiment comprises a pre-printing processing apparatus 251 and a post-printing processing apparatus 252, which are disposed on the upstream and downstream sides, respectively, of the ink jet recording apparatus, along the recording medium conveyance path. These processing apparatuses 251 and 252 process the recording medium in various manners before and after recording, respectively.

The pre-printing process and the post-printing process vary depending on the type of recording medium, or the type of ink. For example, when recording medium composed of a metallic material, plastic material, ceramic material or the like is employed, the recording medium is exposed to ultraviolet rays and ozone before printing to activate its surface, thereby improving the ink adhesion properties. When a recording medium made of a plastic material or the like which tends to cause static electricity is used, dust tends to adhere to its surface because of the static electricity. A proper recording operation may not be performed because of this dust. For this reason, an ionizer may be used in the pre-printing process to remove the static electricity from the recording medium, thereby removing the dust from the medium. In addition, when a textile medium is used as a recording medium, it suffices to perform a pre-printing process of applying a material selected from the group consisting of an alkaline material, a water-soluble material, a synthetic polymer, a water-soluble metal salt, urea, and thiourea to the textile medium so as to prevent blurring and improve the adhesion properties. The pre-printing process is not limited to this. For example, a process of setting the temperature of a recording medium to a temperature suitable for a recording operation may be performed.

The post-printing process includes a heat treatment for a recording medium to which an ink is applied, a fixing process of fixing the ink by ultraviolet irradiation or the like, a process of cleaning an unreacted agent left after the pre-printing process, and the like.

In this embodiment, a full-line head is used. However, the present invention is not limited to this, and may be applied to a recording form in which a small head like the one described above is conveyed along the direction of width of a recording medium.

<Head Kit>

Figure 31:
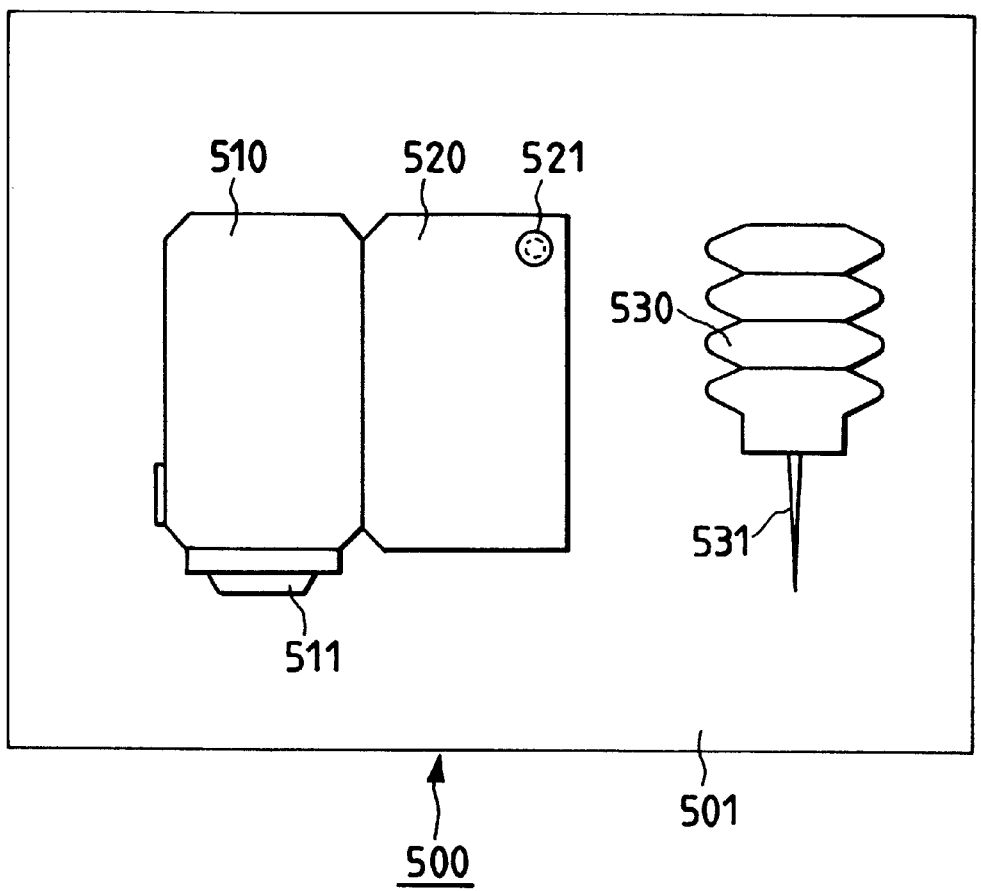
FIG. 31 is a schematic view showing a head kit.

Hereinafter, a head kit will be described, which comprises the liquid ejection head in accordance with the present invention. FIG. 31 is a schematic view of such a head kit. This head kit is in the form of a head kit package 501 which contains: a head 510 of the present invention, which comprises an ink ejection section 511 for ejecting ink; an ink container 520, that is, a liquid container which is separable, or nonseparable, from the head; and an ink filling means 530, which holds the ink to be filled into the ink container 520.

After the ink in the ink container 520 is used up, the tip 530 (in the form of a hypodermic needle or the like) of the ink filling means is inserted into an air vent 521 of the ink container, the junction between the ink container and the head, or a hole formed through the ink container wall, and the ink within the ink filling means is filled into the ink container through this tip 531.

When the liquid ejection head, the ink container, the ink filling means, and the like are available in the form of a kit contained in the kit package, the ink can be easily filled into the empty ink container as described above; therefore, recording can be quickly restarted.

In this embodiment, the head kit contains the ink filling means. However, it is not mandatory for the head kit to contain the ink filling means; the kit may contain an exchangeable type ink container filled with the ink, and a head.

Even though FIG. 31 illustrates only the ink filling means for filling the printing ink into the ink container, the head kit may contain a means for filling the bubble generation liquid into the bubble generation liquid container, in addition to the printing ink refilling means.

According to the above liquid ejecting method, head, and the like of the present invention based on the novel ejection principle using movable members, the synergistic effect of a generated bubble and a movable member displaced thereby can be obtained, and the liquid near the ejection outlet can be efficiently ejected. For this reason, the ejection force and the ejection efficiency can be improved as compared with those in the conventional bubble jet ejecting method, head, and the like. Therefore, even droplets in small ejection amounts can be stably ejected.

According to the present invention, in particular, a plurality of heat generating elements which can be driven independently are arranged for one movable member, or a plurality of movable members are arranged in one liquid flow path (first liquid flow path). With this structure, the ejection amount of liquid can be controlled, and a liquid droplet having a desired volume can be ejected. In addition, ejection of small droplets of small ejection amounts, which is difficult to perform in the prior art, can be stably performed at a high frequency. Therefore, a high-gradation recording operation can be performed at a high speed.

In addition, according to a characteristic feature of the present invention, even if a liquid ejecting head is left unused for a long period of time at a low temperature and a low humidity, a liquid ejection failure can be prevented. Even if an ejection failure occurs, the head can be quickly restored to the normal state with only a small number of times of a recovery process such as pre-ejection or suction recovery process. Therefore, the recovery time can be shortened, and the loss of a liquid can be reduced by a recovery process, thus greatly reducing the running cost.

According to the structure of the present invention which is designed to improve the refilling characteristics, in particular, good response characteristics in a continuous ejection process, stable growth of bubbles, and stabilization of droplets can be attained, thereby realizing a high-speed recording operation based on high-speed liquid ejection, or a high-quality recording operation.

When a liquid which tends to generate bubbles or a liquid with which a deposition (burnt material) is not easily generated on a heat generating element is used as a bubble generation liquid in the head having the two-flow-path structure, the degree of freedom in selecting an ejection liquid increases. The head of the present invention can therefore eject even a liquid which is difficult to eject by using the conventional bubble jet ejecting method, e.g., a high-viscosity liquid which does not easily generate bubbles or a liquid with which a deposition is easily generated on a heat generating element by using a liquid which easily generates a bubble, or a liquid which tends not to generate a deposition (e.g., scorching) on a heat generating element.

Furthermore, a liquid susceptible to heat can be ejected without any adverse effect of heat on the liquid.

By using the liquid ejecting head of the present invention as a liquid ejection recording head, an image with higher quality can be recorded.

In addition, with the liquid ejecting head of the present invention, a liquid ejecting device or recording system whose liquid ejection efficiency is further improved can be provided.

Moreover, with the head cartridge and the head kit of the present invention, the head can be easily used and reused.

What is claimed is:

1. A liquid ejecting head capable of ejecting liquids in different conditions, comprising:
   an ejection outlet for ejecting a liquid;
   a liquid flow path for supplying the liquid to said ejection outlet;
   a plurality of bubble generation heaters provided laterally across a single liquid flow path, said plurality of bubble generation heaters being selectively driven to generate lateral bubbles of different sizes; and
   a movable mechanism that includes a movable member arranged to face a bubble generation region formed in said liquid flow path by at least one of said plurality of bubble generation heaters, the movable member having a free end on a downstream side with respect to a direction of said ejection outlet and a supporting member on an upstream side, wherein
   the movable member is displaced in a direction to separate from the bubble generation region in accordance with a size of a bubble generated by at least one of said plurality of bubble generation heaters,
   a single respective movable member is provided for each liquid flow path, and
   gradation recording is executed by simultaneously or selectively driving said Plurality of bubble generation heaters to generate lateral bubbles of different sizes.

2. A head according to claim 1, wherein each of said plurality of bubble generation heaters comprises a plurality of heat generating elements, at least one of the plurality of heat generating elements being driven independently.

3. A head according to claim 2, wherein the plurality of heat generating elements are arranged from an upstream side to a downstream side with respect to the direction of said ejection outlet.

4. A head according to claim 2, wherein the plurality of heat generating elements are arranged side by side at a substantially equal distance from said ejection outlet.

5. A head according to claim 4, further comprising a partition wall arranged between the plurality of heat generating elements, which are arranged side by sides to suppress lateral escaping of a pressure.

6. A head according to claim 2, wherein said movable mechanism comprises a plurality of movable members arranged side by side at a substantially equal distance from said ejection outlet.

7. A head according to claim 2, wherein the plurality of heat generating elements are of different areas.

8. A head according to claim 2, wherein the plurality of heat generating elements are of substantially a same area.

9. A head according to claim 2, wherein the free end of the movable member is located on a downstream side with respect to a center of the generated bubble.

10. A head according to claim 2, wherein said liquid flow path comprises a supply path extending along the plurality of heat generating elements to supply the liquid onto each heat generating element from an upstream side with respect to each heat generating element.

11. A head according to claim 10, wherein said liquid flow path is a supply path with a substantially flat or smooth inner wall on an upstream side with respect to a heat generating element to supply the liquid onto the heat generating element along the inner wall.

12. A head according to claim 2, further comprising a second liquid flow path extending along a surface near a heat generating element of the movable member to supply the liquid onto the heat generating element from an upstream side.

13. A head according to claim 2, wherein said liquid flow path comprises a first liquid flow path in fluid communication with said ejection outlet, and a second liquid flow path in which a heat generating element for heating the liquid to generate a bubble therein is arranged, and wherein the movable member is arranged between the first and second liquid flow paths.

14. A head according to claim 13, wherein the movable member is part of a partition wall arranged between the first and second liquid flow paths.

15. A head according to claim 14, wherein the partition wall is made of a material selected from the group consisting of metal, resin, and ceramic materials.

16. A head according to claim 13, further comprising a first common liquid chamber for supplying a first liquid to a plurality of first liquid flow paths, and a second common liquid chamber for supplying a second liquid to a plurality of second liquid flow paths.

17. A head according to claim 13, wherein the liquid supplied to the first liquid flow path is a same liquid as that supplied to the second liquid flow path.

18. A head according to claim 13, wherein the liquid supplied to the first liquid flow path is different from that supplied to the second liquid flow path.

19. A head according to claim 13, wherein the second liquid flow path has a chamber-like shape at a portion where the heat generating element is arranged.

20. A head according to claim 13, wherein the second liquid flow path has a shape with a throat portion on an upstream side of the heat generating element.

21. A head according to claim 13, wherein a distance from a surface of the heat generating element to the movable member is not more than 30 pm.

22. A head according to claim 2, wherein each of the plurality of heat generating elements comprises an electrothermal transducer that includes a heat generating resistor for generating heat upon reception of an electrical signal.

23. A head according to claim 22, wherein a wiring pattern for transferring an electrical signal to the electrothermal transducer, and a function element for selectively supplying an electrical signal to the electrothermal transducer are mounted on an element substrate.

24. A head according to claim 2, wherein the liquid ejected from said ejection outlet is an ink.

25. A head according to claim 1, wherein the movable member is a plate-like member.

26. A liquid ejecting method of ejecting a liquid upon generation of a bubble, said method comprising the steps of:
   using a liquid ejecting head that includes an ejection outlet for ejecting a liquid, a plurality of heat generating elements provided laterally across each of a plurality of liquid flow paths for selectively generating lateral bubbles of different sizes in the liquid, and a single movable member respectively provided in each of the plurality of liquid flow paths and arranged to face the plurality of heat generating elements, the single movable member having a free end and a supporting member, wherein the free end is provided at a downstream side toward the ejection outlet and is displaced between a first position and a second position farther from the plurality of heat generating elements than the first position, and wherein the supporting member is provided at an upstream side; and displacing the movable member using a pressure based on generation of a bubble to cause the bubble to expand more greatly at the downstream side than at the upstream side with respect to the ejection outlet, and to change a displaced state of the movable member, the movable member being displaced in accordance with a size of the generated bubble thereby changing an ejection amount of the liquid, wherein gradation recording is executed by simultaneously or selectively driving said plurality of bubble generation heaters to generate lateral bubbles of different sizes.

27. A method according to claim 26, wherein a displaced state of the single movable member changes in accordance with a number of heat generating elements driven with respect to the single movable member.

28. A liquid ejecting method of ejecting a liquid by generating a bubble, said method comprising the steps of:

using a liquid ejecting head that includes an ejection outlet for ejecting a liquid, a plurality of pairs of heat generating elements provided laterally across each of a plurality of liquid flow paths and selectively driven to generate lateral bubbles of different sizes, and a single movable member respectively provided in each of the plurality of liquid flow paths and arranged to face the plurality of pairs of heat generating elements, the single movable member having a free end on a downstream side toward the election outlet, and the free end is displaced between a first position and a second position farther from the plurality of pairs of heat generating elements than the first position, wherein the plurality of pairs of heat generating elements are arranged with respect to the ejection outlet; and displacing the single movable member using a pressure based on generation of a bubble to cause the bubble to expand more greatly on the downstream side than on an upstream side with respect to a direction of the ejection outlet, the single movable member being displaced in accordance with a size of a generated bubble, wherein an ejection amount of the liquid is changed by changing a number of movable members to be operated, and gradation recording is executed by simultaneously or selectively driving said plurality of bubble generation heaters to generate lateral bubbles of different sizes.

29. A method according to any one of claims 26 and 28, wherein the bubble is generated by a film boiling phenomenon caused in the liquid when heat generated by said heat generating element is conducted to the liquid.

30. A method according to any one of claims 26 and 28, wherein the liquid is supplied onto said heat generating element along a flat or smooth inner wall located on an upstream side of said heat generating element.

31. A pre-ejecting method for a liquid ejecting head, said method comprising the steps of:

using a liquid ejecting head that includes an ejection outlet for ejecting a liquid;

using a liquid flow path for supplying the liquid to the ejection outlet;

using a plurality of bubble generation heaters provided laterally across a single liquid flow path for generating bubbles, the plurality of bubble generation heaters being selectively driven to generate lateral bubbles of different sizes;

providing a movable mechanism that includes a movable member arranged to face a bubble generation region formed in the liquid flow path by the plurality of bubble generation heaters, the movable member having a free end on a downstream side with respect to a direction of the ejection outlet and a supporting member on an upstream side; and displacing the movable member in a direction to separate from a bubble generation region;

forming a largest bubble of the bubbles that can be formed by the plurality of bubble generation heaters; and causing the movable member to guide the largest bubble to the ejection outlet, thereby performing a pre-ejection process from the ejection outlet, wherein the movable member is displaced in accordance with a size of a generated bubble, a single respective movable member is provided for each liquid flow path, and gradation recording is executed by simultaneously or selectively driving the plurality of bubble generation heaters to generate lateral bubbles of different sizes.

32. A recording method of performing a gradation recording operation using a liquid ejecting head for ejecting a liquid, said method comprising the steps of:

using a liquid ejecting head that includes an ejection outlet for ejecting a liquid;

using a liquid flow path for supplying the liquid to the ejection outlet;

using a plurality of bubble generation heaters provided laterally across a single liquid flow path to generate bubbles, the plurality of bubble generation heaters being selectively driven to generate lateral bubbles of different sizes;

providing a movable mechanism that includes a movable member arranged to face a bubble generation region formed in the liquid flow path by the plurality of bubble generation heaters, the movable member having a free end on a downstream side with respect to a direction of the ejection outlet and a supporting member on an upstream side; and displacing the movable member in a direction to separate from the bubble generation region and causing the movable member to guide the generated bubbles to the ejection outlet so as to form droplets of different sizes in accordance with the different sizes of the generated bubbles, the movable member being displaced in accordance with a size of a generated bubble, thereby performing a gradation recording operation, wherein a single respective movable member is provided for each liquid flow path, and gradation recording is executed by simultaneously or selectively driving the plurality of bubble generation heaters to generate lateral bubbles of different sizes.

33. A recording method of performing a smoothing operation using a liquid ejecting head capable of ejecting droplets of different sizes, said method comprising the steps of:

using a liquid ejecting head that includes an ejection outlet for ejecting a liquid;

using a liquid flow path for supplying the liquid to the ejection outlet;

using a plurality of bubble generation heaters provided laterally across a single liquid flow path to generate bubbles, the plurality of bubble generation heaters being selectively driven to generate lateral bubbles of different sizes;

providing a movable mechanism that includes a single movable member arranged to face a bubble generation region formed in the liquid flow path by the plurality of bubble generation heaters, the movable member having a free end on a downstream side with respect to a direction of the ejection outlet and a supporting member on an upstream side; and displacing the movable member in a direction to separate from the bubble generation region in accordance with each of the generated bubbles of different sizes, the movable member being displaced in accordance with a size of a generated bubble, thus causing the movable member to guide the generated bubbles to the ejection outlet so as to supply droplets of different sizes corresponding to the different sizes of the generated bubbles to a boundary between an image portion and a non-image portion, thereby performing a smoothing operation, wherein a single respective movable member is provided for each liquid flow path, and gradation recording is executed by simultaneously or selectively driving the plurality of bubble generation heaters to generate lateral bubbles of different sizes.

34. An ink jet recording device using a liquid ejecting head capable of ejecting liquids in different conditions, said device comprising:

a mount portion on which a liquid ejecting head is mounted, the liquid ejecting head including an ejection outlet for ejecting a liquid, a liquid flow path for supplying the liquid to the ejection outlet, a plurality of bubble generation heaters provided laterally across a single liquid flow path for generating bubbles, the plurality of bubble generating heaters being selectively driven to generate lateral bubbles of different sizes, and a movable mechanism that includes a movable member arranged to face a bubble generation region formed in the liquid flow path by the plurality of bubble generation heaters, the movable member having a free end on a downstream side with respect to a direction of the ejection outlet and a supporting member on an upstream side, wherein the movable member is displaced in accordance with a size of a generated bubble, and the movable member is displaced in a direction to separate from the bubble generation region in accordance with a bubble generated by the plurality of bubble generation heaters; and a drive condition selector for supplying the plurality of bubble generation heaters of the liquid ejecting head with an electrical signal corresponding to a recording signal corresponding to a liquid to be ejected, wherein a single respective movable member is provided for each liquid flow path, and gradation recording is executed by simultaneously or selectively driving the plurality of bubble generation heaters to generate lateral bubbles of different sizes.

35. An ink jet recording device according to claim 34, wherein the plurality of bubble generation heaters comprises a plurality of electrothermal transducers.

36. A liquid ejecting head capable of ejecting liquids in different conditions, comprising:

an ejection outlet for ejecting a liquid;

a liquid flow path including a first liquid flow path portion for supplying the liquid to said ejection outlet and a second liquid flow path portion that includes a plurality of bubble generation heaters, wherein the plurality of bubble generating heaters are provided laterally across a single liquid flow path and are selectively driven to generate lateral bubbles of different sizes; and a movable mechanism that includes a movable member arranged to face a bubble generation region formed in the second liquid flow path portion by the plurality of bubble generation heaters, the movable member having a free end on a downstream side with respect to a direction of the ejection outlet and a supporting member on an upstream side, wherein the movable member is displaced in accordance with a size of a generated bubbles such that the generated bubble displaces the movable member in a direction to move the free end to a substantially sealed state with respect to the first liquid flow path portion and to open the bubble generation region to the ejection outlet, a single respective movable member is provided for each liquid flow path, and gradation recording is executed by simultaneously or selectively driving said plurality of bubble generation heaters to generate lateral bubbles of different sizes.

37. A head cartridge comprising:

a liquid ejection head as set forth in either claim 1 or claim 36;

a liquid container for containing liquid to be supplied to said liquid ejection head; and a cartridge housing in which said liquid ejection head and said liquid container are disposed.

38. A head cartridge according to claim 37, wherein said liquid ejection head is separable from said liquid container.

39. A head cartridge according to claim 37, wherein said liquid container is refillable with liquid.

40. A liquid ejection apparatus comprising:

a carriage for carrying a head cartridge;

a liquid ejection head as set forth in either claim 1 or claim 36, said liquid ejection head being detachably mounted on the head cartridge; and a drive signal supplier for supplying a drive signal to said liquid ejection head and causing said liquid ejection head to eject a liquid.

41. A recording system for recording an image on a recording material, comprising:

a holder for holding the recording material;

a liquid ejection apparatus as set forth in claim 40 for applying a liquid in order to record the image on the recording material; and a subsequent process device for promoting a fixation of the liquid on the recorded recording material.

42. A recording system for recording an image on a recording material, comprising:

a holder for holding the recording material;

a liquid ejection apparatus as set forth in claim 40 for applying a liquid in order to record the image on the recording material; and a preliminary process device for promoting a fixation of the liquid on the recording material.

* * * * *

UNITED STATES PATENT AND TRADEMARK OFFICE
CERTIFICATE OF CORRECTION

PATENT NO. : 6,270,199 B1
DATED : August 7, 2001
INVENTOR(S) : Makiko Kimura

It is certified that error appears in the above-identified patent and that said Letters Patent is hereby corrected as shown below:

Column 1,
Line 41, "from" should read -- form --.

Column 2,
Line 6, "filing" should read -- filling --.

Column 6,
Line 50, "an" should read -- a --.

Column 8,
Line 23, "view" should read -- views --.

Column 9,
Line 18, "pm" should read -- $\mu$m --; and "if" should be deleted.

Column 12,
Line 55, "structure of," should read -- structure, --.

Column 20,
Line 3, "ejection outlet are" should read -- the ejection outlet is --.
Line 44, "ejection" should read -- eject --.

Column 24,
Line 47, "and the" should read -- and --.
Line 51, "on the" should be deleted.

Column 25,
Line 28, "au" should read -- an --.

Column 27,
Line 16, "includes:" should read -- include: --.
Line 19, "Trichloroethylene," should read -- trichloroethylene, --.

Column 33,
Line 36, "Plurality" should read -- plurality --.
Line 52, "sides" should read -- side, --.

UNITED STATES PATENT AND TRADEMARK OFFICE
CERTIFICATE OF CORRECTION

PATENT NO. : 6,270,199 B1
DATED : August 7, 2001
INVENTOR(S) : Makiko Kimura

It is certified that error appears in the above-identified patent and that said Letters Patent is hereby corrected as shown below:

Column 35,
Line 60, "said" should read -- the --.

Column 38,
Line 17, "bubbles" should read -- bubble, --.

Signed and Sealed this

Twelfth Day of March, 2002

Attest:

Attesting Officer

JAMES E. ROGAN
Director of the United States Patent and Trademark Office